United States Patent
Ji et al.

(10) Patent No.: US 11,705,941 B2
(45) Date of Patent: Jul. 18, 2023

(54) QUASI-CO-LOCATION INDICATION METHOD AND APPARATUS

(71) Applicant: HUAWEI TECHNOLOGIES CO., LTD., Shenzhen (CN)

(72) Inventors: Liuliu Ji, Shanghai (CN); Xiaohan Wang, Shanghai (CN); Haicun Hang, Shanghai (CN); Shibin Ge, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/370,962

(22) Filed: Jul. 8, 2021

(65) Prior Publication Data

US 2021/0336656 A1  Oct. 28, 2021

Related U.S. Application Data

(63) Continuation of application No. PCT/CN2020/071536, filed on Jan. 10, 2020.

(30) Foreign Application Priority Data

Jan. 11, 2019 (CN) .......................... 201910028367.7

(51) Int. Cl.
*H04L 7/02* (2006.01)
*H04B 7/024* (2017.01)
(Continued)

(52) U.S. Cl.
CPC ........... *H04B 7/024* (2013.01); *H04B 7/0608* (2013.01); *H04L 5/0023* (2013.01)

(58) Field of Classification Search
CPC ...... H04B 7/024; H04B 7/0608; H04L 5/0023
(Continued)

(56) References Cited

U.S. PATENT DOCUMENTS

2017/0099656 A1   4/2017  Seo et al.
2019/0238211 A1*  8/2019  Enescu ................. H04B 7/088

FOREIGN PATENT DOCUMENTS

CN   104106223 A   10/2014
CN   107888236 A    4/2018
(Continued)

OTHER PUBLICATIONS

Chinese Notice of Allowance issued in corresponding Chinese Application No. 201910028367.7, dated Aug. 19, 2021, pp. 1-5.
(Continued)

*Primary Examiner* — Kevin M Burd
(74) *Attorney, Agent, or Firm* — Hauptman Ham, LLP

(57) ABSTRACT

This application relates to the field of communications technologies and provides a quasi co-location indication method and an apparatus, so that a terminal learns of a quasi co-location relationship between a plurality of antenna ports of a first reference signal resource. The method includes: A terminal receives quasi-co-location indication information, where the quasi-co-location indication information is used to indicate M antenna port groups corresponding to a first reference signal resource, each of the M antenna port groups includes one or more CDM groups of the first reference signal resource, the CDM group includes a plurality of antenna ports, and any two antenna ports in a same antenna port group are in a quasi-co-location relationship. Then, the terminal determines a quasi-co-location relationship between a plurality of antenna ports of the first reference signal resource based on the quasi-co-location indication information.

20 Claims, 7 Drawing Sheets

(51) Int. Cl.
*H04B 7/06* (2006.01)
*H04L 5/00* (2006.01)

(58) Field of Classification Search
USPC .......................................................... 375/262
See application file for complete search history.

(56) References Cited

FOREIGN PATENT DOCUMENTS

| CN | 107888266 A | 4/2018 |
|---|---|---|
| CN | 108111272 A | 6/2018 |
| CN | 108111278 A | 6/2018 |
| CN | 108173634 A | 6/2018 |
| CN | 109150250 A | 1/2019 |
| CN | 109150473 A | 1/2019 |
| CN | 109391413 A | 2/2019 |
| CN | 109842468 A | 6/2019 |
| EP | 3442136 A1 | 2/2019 |
| WO | 2017181818 A1 | 10/2017 |
| WO | WO-2017181818 A1 * 10/2017 ............. H04B 7/024 |
| WO | 2018028384 A1 | 2/2018 |

OTHER PUBLICATIONS

European Search Report issued in corresponding European Application No. 20738692.1, dated Jan. 26, 2022, pp. 1-7.
Huawei, HiSilicon, Details of QCL assumptions and related RS design considerations. 3GPP TSG RAN WG1 Meeting #88bis, Spokane, USA, Apr. 3-7, 2017, R1-1704239, 5 pages.
3GPP TS 38.214 V15.3.0 (Sep. 2018), 3rd Generation Partnership Project; Technical Specification Group Radio Access Network; NR; Physical layer procedures for data (Release 15), 96 pages.
CATT, On DMRS design for DL 3GPP TSG RAN WG1 Meeting #90, Prague, Czechia, Aug. 21-25, 2017, R1-1712383, 8 pages.
Chinese Office Action issued in corresponding Chinese Application No. 201910028367.7, dated Jan. 18, 2021, pp. 1-14.
International Search Report issued in corresponding International Application No. PCT/CN2020/071536, dated Apr. 8, 2020, pp. 1-11.

* cited by examiner

QUASI-CO-LOCATION INDICATION METHOD AND APPARATUS

CROSS-REFERENCE TO RELATED APPLICATIONS

This application is a continuation of International Application No. PCT/CN2020/071536, filed on Jan. 10, 2020, which claims priority to Chinese Patent Application No. 201910028367.7, filed on Jan. 11, 2019. The disclosures of the aforementioned applications are hereby incorporated by reference in their entireties.

TECHNICAL FIELD

This application relates to the field of communications technologies, and in particular, to a quasi-co-location indication method and an apparatus.

BACKGROUND

Coordinated multi-point transmission (Coordinated Multi-point transmission, CoMP) is a technology used to cope with inter-cell interference and improve a throughput of a user at a cell edge. To support the CoMP, a concept of antenna port quasi-co-location (Quasi-Co-Location, QCL) is introduced in a protocol. The antenna port QCL is an assumption of a state of a channel between antenna ports. If two antenna ports are in a QCL relationship, large-scale information of a channel for one antenna port can be inferred from large-scale information of a channel for the other antenna port. Contrarily, if two antenna ports are not in a QCL relationship, a terminal should not assume that large-scale information of a channel for one antenna port can be inferred from large-scale information of a channel for the other antenna port.

Currently, when time-frequency resources are insufficient, a plurality of transmission reception points (Transmission Reception Point, TRP) may jointly send one channel state information reference signal (channel state information reference signal, CSI-RS) resource for a terminal, and antenna ports in the CSI-RS resource belong to different TRPs. In other words, each TRP transmits some antenna ports in one CSI-RS resource, and signals transmitted by a plurality of TRPs jointly form one CSI-RS. Because different TRPs may be located in different geographical locations, antenna ports in the CSI-RS resource that belong to different TRPs may not necessarily be in a QCL relationship. However, when the terminal does not know a transmission setting, the terminal assumes that all antenna ports in one CSI-RS resource are QCL. In this case, a deviation may occur when the terminal performs channel estimation based on the CSI-RS. When performing channel measurement, the terminal obtains an incorrect measurement result due to the inappropriate QCL assumption.

SUMMARY

This application provides a quasi-co-location indication method, to resolve a problem that a terminal makes an inappropriate QCL assumption on a plurality of antenna ports in one reference signal resource.

To achieve the foregoing objective, the following technical solutions are used in this application.

According to a first aspect, a quasi-co-location indication method is provided, including: A terminal receives quasi-co-location indication information. The quasi-co-location indication information is used to indicate M antenna port groups corresponding to a first reference signal resource. Each of the M antenna port groups includes one or more code division multiplexing (code division multiplexing, CDM) groups of the first reference signal resource. The CDM group includes a plurality of antenna ports. Any two antenna ports in a same antenna port group are in a quasi-co-location relationship. M is an integer greater than 1. The terminal determines a quasi-co-location relationship between a plurality of antenna ports of the first reference signal resource based on the quasi-co-location indication information.

It can be understood that the first reference signal resource may be a CSI-RS resource, or may be another reference signal resource, for example, a synchronization signal resource or a channel sounding signal (Sounding reference signal) resource. This embodiment of this application is not limited thereto.

According to the foregoing technical solution, the terminal determines, by using the quasi-co-location indication information, the M antenna port groups corresponding to the first reference signal resource. Therefore, for the plurality of antenna ports of the first reference signal resource, the terminal may determine, by determining whether two antenna ports belong to a same antenna port group, whether the two antenna ports are quasi-co-located. By analogy, the terminal may learn of the quasi-co-location relationship between the plurality of antenna ports of the first reference signal resource. In addition, the antenna port group includes one or more CDM groups. In other words, a plurality of antenna ports in one CDM group also belong to a same antenna port group. In this case, a plurality of antenna port groups in one CDM group are in a quasi-co-location relationship, thereby ensuring that signals sent by a plurality of antenna ports in one CDM group go through a same channel, and ensuring orthogonality of signals sent by a plurality of antenna ports in one CDM group.

With reference to the first aspect, in a possible design, the quasi-co-location indication information includes information about the M antenna port groups. The information about the antenna port group includes an identifier of one or more CDM groups; or the information about the antenna port group is used to indicate a quantity of CDM groups included in the antenna port group.

Optionally, the information about the antenna port group may further include a quantity of antenna port groups, an identifier of the antenna port group, a quantity of antenna ports included in the antenna port group, an antenna port included in the antenna port group, and the like.

With reference to the first aspect, in a possible design, the quasi-co-location indication information is further used to indicate a value of M.

With reference to the first aspect, in a possible design, the quasi-co-location indication information is further used to indicate a grouping manner of CDM groups, and the grouping manner includes at least one of a time domain grouping manner and a frequency domain grouping manner.

According to a second aspect, a quasi-co-location indication method is provided, including: A terminal receives quasi-co-location indication information. The quasi-co-location indication information is used to indicate M antenna port groups corresponding to a first reference signal resource. Each of the M antenna port groups includes one or more antenna ports of the first reference signal resource. Any two antenna ports in a same antenna port group are in a quasi-co-location relationship. M is an integer greater than 1. The terminal determines a quasi-co-location relationship between a plurality of antenna ports of the first reference signal resource based on the quasi-co-location indication information.

According to the foregoing technical solution, the terminal determines, by using the quasi-co-location indication information, the M antenna port groups corresponding to the first reference signal resource. Therefore, for the plurality of antenna ports of the first reference signal resource, the terminal may determine, by determining whether two antenna ports belong to a same antenna port group, whether the two antenna ports are quasi-co-located. By analogy, the terminal may learn of the quasi-co-location relationship between the plurality of antenna ports of the first reference signal resource.

With reference to the second aspect, in a possible design, the quasi-co-location indication information includes information about the M antenna port groups. The information about the antenna port group includes port numbers of a plurality of antenna ports; or the information about the antenna port group is used to indicate a quantity of antenna ports included in the antenna port group.

With reference to the second aspect, in a possible design, the quasi-co-location indication information is further used to indicate a value of M.

According to a third aspect, a quasi-co-location indication method is provided, including: A terminal receives quasi-co-location indication information corresponding to a first reference signal resource. The quasi-co-location indication information is used to indicate that at least two of a plurality of antenna ports of the first reference signal resource are not in a quasi-co-location relationship. The terminal groups the plurality of antenna ports of the first reference signal resource into M antenna port groups according to a first quasi-co-location rule, where M is an integer greater than 1.

According to the foregoing technical solution, the terminal determines, by using the quasi-co-location indication information, the M antenna port groups corresponding to the first reference signal resource. Therefore, for the plurality of antenna ports of the first reference signal resource, the terminal may determine, by determining whether two antenna ports belong to a same antenna port group, whether the two antenna ports are quasi-co-located. By analogy, the terminal may learn of a quasi-co-location relationship between the plurality of antenna ports of the first reference signal resource.

With reference to the third aspect, in a possible design, the quasi-co-location indication information is used to indicate that both a channel measurement resource and an interference measurement resource are the first reference signal resource. In this case, because the first reference signal resource is both the channel measurement resource and the interference measurement resource, it indicates that of the first reference signal resource, signals sent by some antenna ports cause interference to signals sent by other antenna ports. Therefore, it indicates that at least two antenna ports of the first reference signal resource are not in a quasi-co-location relationship.

Optionally, the quasi-co-location information is configuration information of the first reference signal resource. The configuration information of the first reference signal resource may be used to indicate channel state measurement and/or reporting information of the terminal. The configuration information of the first reference signal resource includes a resource used for channel measurement and a resource used for interference measurement. The resource used for channel measurement includes the first reference signal resource, and the resource used for interference measurement includes the first reference signal resource.

With reference to the third aspect, in a possible design, the quasi-co-location indication information further includes an index of the first quasi-co-location rule.

With reference to the third aspect, in a possible design, the first quasi-co-location rule includes one of the following rules: (1) grouping a preset quantity of antenna ports into one antenna port group in ascending order of port numbers of the antenna ports; and (2) grouping a preset quantity of antenna ports into one antenna port group in descending order of port numbers of the antenna ports.

According to a fourth aspect, a quasi-co-location indication method is provided, including: A terminal receives quasi-co-location indication information corresponding to a first reference signal resource. The quasi-co-location indication information is used to indicate that at least two of a plurality of antenna ports of the first reference signal resource are not in a quasi-co-location relationship. Then the terminal groups a plurality of CDM groups of the first reference signal into M antenna port groups according to a second quasi-co-location rule, where M is an integer greater than 1.

According to the foregoing technical solution, the terminal determines, by using the quasi-co-location indication information, the M antenna port groups corresponding to the first reference signal resource. Therefore, for the plurality of antenna ports of the first reference signal resource, the terminal may determine, by determining whether two antenna ports belong to a same antenna port group, whether the two antenna ports are quasi-co-located. By analogy, the terminal may learn of a quasi-co-location relationship between the plurality of antenna ports of the first reference signal resource.

With reference to the fourth aspect, in a possible design, the quasi-co-location indication information is used to indicate that both a channel measurement resource and an interference measurement resource are the first reference signal resource.

With reference to the fourth aspect, in a possible design, the quasi-co-location indication information further includes an index of the second quasi-co-location rule.

With reference to the fourth aspect, in a possible design, the second quasi-co-location rule includes one of the following rules: (1) grouping a preset quantity of CDM groups into one antenna port group in ascending order of identifiers of the CDM groups; and (2) grouping a preset quantity of CDM groups into one antenna port group in descending order of identifiers of the CDM groups.

With reference to any one of the first aspect to the fourth aspect, in a possible design, the terminal receives first indication information. The first indication information is used to indicate an antenna port group that is of a second reference signal resource and that has a quasi-co-location relationship with an antenna port group of the first reference signal resource. Alternatively, the first indication information is used to indicate an antenna port that is of a second reference signal resource and that has a quasi-co-location relationship with an antenna port of the first reference signal resource. In this case, the terminal learns of, based on the first indication information, the antenna port (or the antenna port group) that is of the second reference signal resource and that has a quasi-co-location relationship with the antenna port (or the antenna port group) of the first reference signal resource. Therefore, the terminal may infer, from large-scale information of a channel for the antenna port (or the antenna port group) of the second reference signal resource, large-scale information of a channel for the antenna port (or the antenna port group) that is of the first reference signal resource and that has a quasi-co-location relationship with the antenna port (or the antenna port group) of the second reference signal resource.

With reference to any one of the first aspect to the fourth aspect, in a possible design, the terminal receives second indication information. The second indication information is used to indicate an antenna port group that is of the first reference signal resource and that has a quasi-co-location relationship with an antenna port group of a second reference signal resource. Alternatively, the second indication information is used to indicate an antenna port that is of the first reference signal resource and that has a quasi-co-location relationship with an antenna port of a second reference signal resource. In this case, the terminal learns of, based on the second indication information, the antenna port (or the antenna port group) that is of the first reference signal resource and that has a quasi-co-location relationship with the antenna port (or the antenna port group) of the second reference signal resource. Therefore, the terminal may infer, from large-scale information of a channel for the antenna port (or the antenna port group) of the first reference signal resource, large-scale information of a channel for the antenna port (or the antenna port group) that is of the second reference signal resource and that has a quasi-co-location relationship with the antenna port (or the antenna port group) of the first reference signal resource.

With reference to any one of the first aspect to the fourth aspect, in a possible design, the terminal determines downlink channel state information based on the quasi-co-location relationship between the plurality of antenna ports of the first reference signal resource. It can be understood that the terminal makes an appropriate quasi-co-location assumption based on the quasi-co-location relationship between the plurality of antenna ports of the first reference signal resource, thereby ensuring accuracy of the downlink channel state information.

According to a fifth aspect, a quasi-co-location indication method is provided, including: A network device generates quasi-co-location indication information. The quasi-co-location indication information is used to indicate M antenna port groups corresponding to a first reference signal resource. Each of the M antenna port groups includes one or more CDM groups of the first reference signal resource. The CDM group includes a plurality of antenna ports. Any two antenna ports in a same antenna port group are in a quasi-co-location relationship. M is an integer greater than 1. The network device sends the quasi-co-location indication information to a terminal.

With reference to the fifth aspect, in a possible design, the quasi-co-location indication information includes information about the M antenna port groups. The information about the antenna port group includes an identifier of one or more CDM groups; or the information about the antenna port group is used to indicate a quantity of CDM groups included in the antenna port group.

With reference to the fifth aspect, in a possible design, the quasi-co-location indication information is further used to indicate a value of M.

With reference to the fifth aspect, in a possible design, the quasi-co-location indication information is further used to indicate a grouping manner of CDM groups, and the grouping manner includes at least one of a time domain grouping manner and a frequency domain grouping manner.

According to a sixth aspect, a quasi-co-location indication method is provided, including: A network device generates quasi-co-location indication information. The quasi-co-location indication information is used to indicate M antenna port groups corresponding to a first reference signal resource. Each of the M antenna port groups includes one or more antenna ports of the first reference signal resource. Any two antenna ports in a same antenna port group are in a quasi-co-location relationship. M is an integer greater than 1. Then the network device sends the quasi-co-location indication information to a terminal.

With reference to the sixth aspect, in a possible design, the quasi-co-location indication information includes information about the M antenna port groups. The information about the antenna port group includes port numbers of a plurality of antenna ports; or the information about the antenna port group is used to indicate a quantity of antenna ports included in the antenna port group.

With reference to the sixth aspect, in a possible design, the quasi-co-location indication information is further used to indicate a value of M.

According to a seventh aspect, a quasi-co-location indication method is provided, including: A network device generates quasi-co-location indication information corresponding to a first reference signal resource. The quasi-co-location indication information is used to indicate that at least two of N antenna ports of the first reference signal resource are not in a quasi-co-location relationship. Then the network device sends the quasi-co-location indication information to a terminal.

With reference to the seventh aspect, in a possible design, the quasi-co-location indication information is used to indicate that both a channel measurement resource and an interference measurement resource are the first reference signal resource.

With reference to the seventh aspect, in a possible design, the quasi-co-location indication information further includes an index of a first quasi-co-location rule or an index of a second quasi-co-location rule. The first quasi-co-location rule is used by the terminal to group a plurality of antenna ports of the first reference signal resource into M antenna port groups. The second quasi-co-location rule is used by the terminal to group a plurality of CDM groups of the first reference signal resource into M antenna port groups. M is an integer greater than 1.

With reference to any one of the fifth aspect to the seventh aspect, in a possible design, the network device generates first indication information. The first indication information is used to indicate an antenna port group that is of a second reference signal resource and that has a quasi-co-location relationship with an antenna port group of the first reference signal resource. Alternatively, the first indication information is used to indicate an antenna port that is of a second reference signal resource and that has a quasi-co-location relationship with an antenna port of the first reference signal resource. Then the network device sends the first indication information to the terminal.

With reference to any one of the fifth aspect to the seventh aspect, in a possible design, the network device generates second indication information. The second indication information is used to indicate an antenna port group that is of the first reference signal resource and that has a quasi-co-location relationship with an antenna port group of a second reference signal resource. Alternatively, the second indication information is used to indicate an antenna port that is of the first reference signal resource and that has a quasi-co-location relationship with an antenna port of a second reference signal resource. Then the network device sends the second indication information to the terminal.

With reference to any one of the fifth aspect to the seventh aspect, in a possible design, the network device receives downlink channel state information. The downlink channel state information is determined based on a quasi-co-location relationship between the plurality of antenna ports of the first reference signal resource.

According to an eighth aspect, a terminal is provided, including a communications module and a processing module. The terminal is configured to perform the quasi-co-location indication method according to any one of the first aspect to the fourth aspect.

According to a ninth aspect, a terminal is provided, including a processor. The processor is configured to be coupled to a memory, read instructions in the memory, and implement, according to the instructions, the quasi-co-location indication method according to any one of the first aspect to the fourth aspect.

According to a tenth aspect, a communications apparatus is provided, configured to perform the quasi-co-location indication method according to any one of the first aspect to the fourth aspect. In a possible product form, the communications apparatus is implemented by a processor and a communications interface. In another possible product form, the communications apparatus is implemented by a logic circuit, an input interface, and an output interface.

According to an eleventh aspect, a computer-readable storage medium is provided. The computer-readable storage medium stores instructions. When the instructions are run on a terminal, the terminal is enabled to perform the quasi-co-location indication method according to any one of the first aspect to the fourth aspect.

According to a twelfth aspect, a computer program product including instructions is provided. When the computer program product is run on a terminal, the terminal is enabled to perform the quasi-co-location indication method according to any one of the first aspect to the fourth aspect.

According to a thirteenth aspect, a chip system is provided. The chip system includes a processor, configured to support a terminal in implementing the functions included in any one of the first aspect to the fourth aspect. It should be noted that the processor may be a dedicated processor or a general purpose processor. In a possible design, the chip system includes a memory, and the memory is configured to store program instructions and data that are necessary for the terminal. The chip system may include a chip, or may include a chip and another discrete device.

For a technical effect of any design manner in the eighth aspect to the thirteenth aspect, refer to technical effects of different design manners in the first aspect to the fourth aspect. Details are not described herein again.

According to a fourteenth aspect, a network device is provided, including a processing module and a communications module. The network device is configured to perform the quasi-co-location indication method according to any one of the fifth aspect to the seventh aspect.

According to a fifteenth aspect, a network device is provided, including a processor. The processor is configured to be coupled to a memory, read instructions in the memory, and implement, according to the instructions, the quasi-co-location indication method according to any one of the fifth aspect to the seventh aspect.

According to a sixteenth aspect, a communications apparatus is provided, configured to perform the quasi-co-location indication method according to any one of the fifth aspect to the seventh aspect. In a possible product form, the communications apparatus is implemented by a processor and a communications interface. In another possible product form, the communications apparatus is implemented by a logic circuit, an input interface, and an output interface.

According to a seventeenth aspect, a computer-readable storage medium is provided. The computer-readable storage medium stores instructions. When the instructions are run on a network device, the network device is enabled to perform the quasi-co-location indication method according to any one of the fifth aspect to the seventh aspect.

According to an eighteenth aspect, a computer program product including instructions is provided. When the computer program product is run on a network device, the network device is enabled to perform the quasi-co-location indication method according to any one of the fifth aspect to the seventh aspect.

According to a nineteenth aspect, a chip system is provided. The chip system includes a processor, configured to support a network device in implementing the functions included in any one of the fifth aspect to the seventh aspect. It should be noted that the processor may be a dedicated processor or a general purpose processor. In a possible design, the chip system includes a memory, and the memory is configured to store program instructions and data that are necessary for the network device. The chip system may include a chip, or may include a chip and another discrete device.

For a technical effect of any design manner in the fourteenth aspect to the nineteenth aspect, refer to technical effects of different design manners in the fifth aspect to the seventh aspect. Details are not described herein again.

According to a twentieth aspect, a communications system is provided. The communications system includes a network device and a terminal. The terminal is configured to perform the quasi-co-location indication method according to any one of the first aspect to the fourth aspect. The network device is configured to perform the quasi-co-location indication method according to any one of the fifth aspect to the seventh aspect.

DESCRIPTION OF EMBODIMENTS

Figure 1:
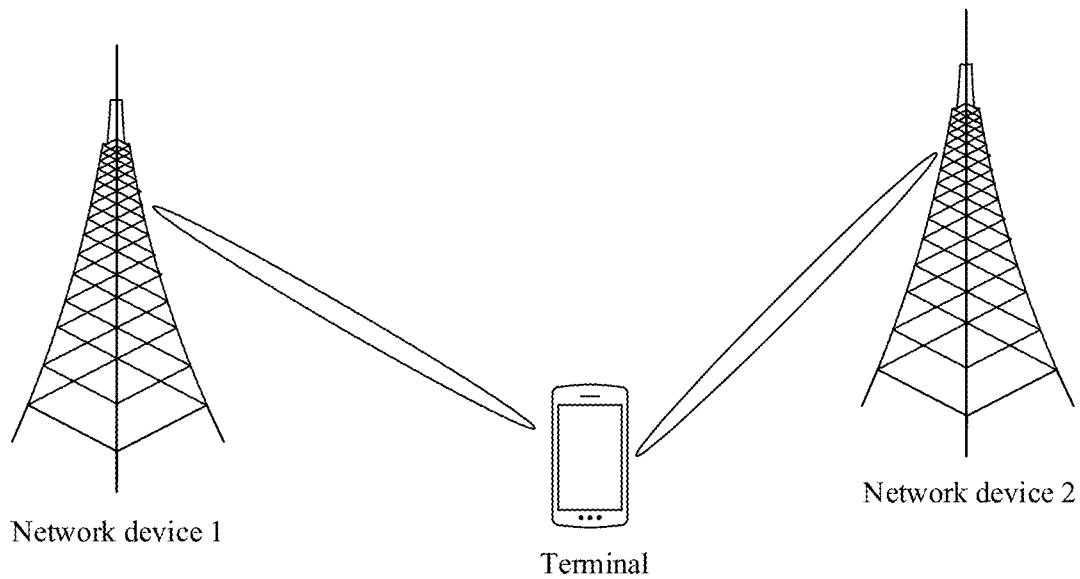
FIG. 1 is a schematic architectural diagram of a communications system according to an embodiment of this application.

For ease of understanding the technical solutions of this application, the following first briefly describes some terms used in this application.

1. Antenna port

An antenna port may be understood as a transmit antenna that can be identified by a receive-end device, or a transmit antenna that can be spatially distinguished. An antenna port may be defined based on a reference signal (in other words, a pilot signal) associated with the antenna port. An antenna port may be a physical antenna on a transmit-end device, or may be a weighted combination of a plurality of physical antennas on a transmit-end device. In the embodiments of this application, unless otherwise specified, one antenna port corresponds to one reference signal. In addition, it should be noted that a plurality of antenna ports may be configured for one reference signal resource.

An antenna port is configured to carry at least one of a specific physical channel or physical signal. For signals sent by using a same antenna port, regardless of whether the signals are sent by using a same physical antenna or different physical antennas, channels corresponding to paths through which the signals are transmitted in space may be considered the same or related. In other words, during demodulation, a receive end may consider that channels for signals sent by using a same antenna port are the same or related. In other words, an antenna port defines a channel on a symbol. If antenna ports of two symbols are the same, a channel on one symbol may be inferred from a channel on the other symbol.

In the embodiments of this application, an antenna port is uniquely identified by a port number. The port number may alternatively have another name, for example, a port index or a port identifier. The embodiments of this application are not limited thereto. When an antenna port is uniquely identified by a port number, the port number may be further changed by using a function, to uniquely identify the port. For example, a port number used by an indication terminal serves as an input of the function, and an actually used identifier of the antenna port serves as an output of the function. In the function, the input and the output are in a one-to-one mapping relationship. For example, in the function, a constant plus the input equals the output. The actually used identifier of the antenna port may serve as an identifier for generating a signal of the antenna port, for example, an identifier for generating a sequence of the antenna port. The identifier may include an identifier of a pseudo-random function initialization factor for generating the sequence.

2. Reference signal resource

A reference signal resource is a resource for a reference signal. The reference signal includes but is not limited to a CSI-RS, a demodulation reference signal (demodulation reference signal, DMRS), a tracking reference signal (tracking reference signal, TRS), a sounding reference signal (sounding reference signal, SRS), and the like. The embodiments of this application are not limited thereto. In addition, for ease of description, a resource for a first reference signal is referred to as a first reference signal resource, and a resource for a second reference signal is referred to as a second reference signal resource below.

The reference signal resource corresponds to at least one of a time domain resource, a frequency domain resource, or a code domain resource for the reference signal. Configuration information of the reference signal resource is a data structure that includes a plurality of parameters and that is used for encapsulating information related to the reference signal, for example, a type of the reference signal, a resource element (resource element, RE) for carrying the reference signal, and a quantity of antenna ports used for sending the reference signal. Each reference signal resource has a corresponding identifier. The identifier of the reference signal resource may also be referred to as an index of the reference signal resource, or the like. The embodiments of this application are not limited thereto.

3. CDM group

A CDM group includes a plurality of antenna ports. A plurality of antenna ports in one CDM group reuse a same time-frequency resource, and a plurality of antenna ports in one CDM group are distinguished in a form of code division, that is, code domain resources for sequences of a plurality of antenna ports in one CDM are different. The code domain resource is usually an orthogonal code, for example, an orthogonal cover code (Orthogonal Cover Code, OCC). The OCC code may be used in time domain, frequency domain, space domain (beam domain), or the like.

A quantity of CDM groups in a reference signal resource and information about a CDM group may be preconfigured by a network device for a terminal, or may be defined in a protocol.

Optionally, if the quantity of CDM groups in the reference signal resource and the information about the CDM group are defined in a protocol, the quantity of CDM groups in the reference signal resource and the information about the CDM group are determined based on a quantity of antenna ports in the reference signal resource. The information about the CDM group includes an index of the CDM group, a port number of an antenna port in the CDM group, and the like.

For example, the reference signal resource includes an antenna port #0 to an antenna port #3. It may be defined in a protocol that a quantity of CDM groups is 2, a CDM group #0 includes the antenna port #0 and the antenna port #1, and a CDM group #1 includes the antenna port #2 and the antenna port #3.

In addition, the network device may send resource pattern (pattern) information of the CDM group to the terminal, so that the terminal learns of a time-frequency resource corresponding to each CDM group. In other words, the resource pattern information is used to indicate a time-frequency resource occupied by an antenna port in the CDM group.

For example, the resource pattern information of the CDM group may be shown in Table 1. In Table 1, "ports" is used to indicate a quantity of antenna ports in a reference signal resource, A density (density) is used to indicate a quantity of REs occupied by one antenna port in one resource block (resource block, RB), and A CDM-type (type) is used to indicate whether a CDM group is a time domain CDM group or a frequency domain CDM group. (k, l) indicates a time-frequency location of the $1^{st}$ RE in a CDM group, where k corresponds to a frequency domain location, and l corresponds to a time domain location. k' indicates a frequency domain offset of an RE occupied by a CDM group relative to the $1^{st}$ RE in the CDM group. l' indicates a time domain offset of an RE occupied by a CDM group relative to the $1^{st}$ RE in the CDM group.

TABLE 1

| Resource pattern index | 6 | 7 | 8 |
|---|---|---|---|
| Ports | 8 | 8 | 8 |
| Density | 1 | 1 | 1 |
| CDM-type | FD-CDM2 | FD-CDM2 | CDM4 (FD2, TD2) |
| (k, l) | $(k_0, l_0)$, $(k_1, l_0)$, $(k_2, l_0)$, $(k_3, l_0)$ | $(k_0, l_0)$, $(k_1, l_0)$, $(k_0, l_0 + 1)$, $(k_1, l_0 + 1)$ | $(k_0, l_0)$, $(k_1, l_0)$ |
| CDM group index | 0, 1, 2, 3 | 0, 1, 2, 3 | 0, 1 |
| k' | 0,1 | 0, 1 | 0, 1 |
| l' | 0 | 0 | 0, 1 |

For description with reference to Table 1, a resource pattern with an index of 6 is used as an example. "Ports" is 8, indicating that eight antenna ports are configured for the reference signal resource. A density is 1, indicating that a quantity of REs occupied by each antenna port in one RB is 1. A CDM-type is FD-CDM2, indicating that a CDM group is a frequency domain CDM group, and the CDM group includes two antenna ports. CDM group indexes are 0, 1, 2, and 3, indicating that a CDM group #0, a CDM group #1, a CDM group #2, and a CDM group #3 are configured for the reference signal resource. (k, l) is $(k_0, l_0)$, $(k_1, l_0)$, $(k_2, l_0)$, $(k_3, l_0)$, indicating that a time-frequency location of the $1^{st}$ RE occupied by the CDM group #0 is $(k_0, l_0)$, a time-frequency location of the $1^{st}$ RE occupied by the CDM group #1 is $(k_1, l_0)$, a time-frequency location of the $1^{st}$ RE occupied by the CDM group #2 is $(k_2, l_0)$, and a time-frequency location of the $1^{st}$ RE occupied by the CDM group #3 is $(k_3, l_0)$. k' is 0, 1, indicating that locations of REs occupied by the CDM group #0 are $(k_0, l_0)$ and $(k_0+1, l_0)$, locations of REs occupied by the CDM group #1 are $(k_1, l_0)$ and $(k_1+1, l_0)$, locations of REs occupied by the CDM group #2 are $(k_2, l_0)$ and $(k_2+1, l_0)$, and locations of REs occupied by the CDM group #3 are $(k_3, l_0)$ and $(k_3+1, l_0)$.

4. Quasi-co-location relationship

A QCL relationship is used to indicate that a plurality of antenna ports have one or more same or similar communications features. For example, if two antenna ports are in a quasi-co-location relationship, large-scale properties of a channel on which one antenna port sends a signal may be inferred from large-scale properties of a channel on which the other antenna port sends a signal. For two antenna ports in a QCL relationship, signals corresponding to the two antenna ports have a same parameter; or a parameter of one antenna port may be used to determine a parameter of the other antenna port that has a QCL relationship with the antenna port; or a parameter difference between the two antenna ports is less than a preset threshold.

The foregoing parameter may include one or more of the following large-scale parameters of a channel: a delay spread (delay spread), a Doppler spread (Doppler spread), a Doppler shift (Doppler shift), an average delay (average delay), an average gain, and a spatial receive parameter (spatial Rx parameters). The spatial receive parameter may include one or more of an angle of departure (angle of departure, AoD), a dominant angle of departure (dominant AoD), a mean angle of departure (mean AoD), an angle of arrival (angle of arrival, AoA), a dominant angle of arrival (dominant AoA), an average angle of arrival (average AoA), a channel correlation matrix, a power azimuth spectrum of an angle of arrival, an average angle of departure (average AoD), a power azimuth spectrum of an angle of departure, a transmit channel correlation, a receive channel correlation, a transmit beamforming, a receive beamforming, a spatial channel correlation, a spatial filter parameter, a spatial receive parameter, and the like.

In the descriptions of this application, unless otherwise specified, "I" means "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, "at least one" means one or more, and "a plurality of" means two or more. Words such as "first" and "second" do not limit a quantity and an execution sequence, and the words such as "first" and "second" do not limit a definite difference.

It should be noted that, in this application, the word "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a relative concept in a specific manner.

In descriptions of this application, the term "indication" may include a direct indication and an indirect indication, or may include an explicit indication and an implicit indication. Information indicated by a piece of information (quasi co-location indication information described below) is referred to as to-be-indicated information. In a specific implementation process, there are a plurality of manners of indicating the to-be-indicated information. For example, the to-be-indicated information may be directly indicated, and the to-be-indicated information may be indicated by using the to-be-indicated information, an index of the to-be-indicated information, or the like. For another example, the to-be-indicated information may be indirectly indicated by indicating other information, and there is an association relationship between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

In addition, a network architecture and a service scenario that are described in embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

The technical solutions provided in the embodiments of this application may be applied to various communications systems, for example, a new radio (new radio, NR) communications system that uses a 5th generation (5th generation, 5G) communications technology, a future evolved system, or a plurality of converged communications systems. The technical solutions provided in this application may be applied to a plurality of application scenarios, for example, machine to machine (machine to machine, M2M) communication, macro-micro communication, enhanced mobile broadband (enhanced mobile broadband, eMBB)

communication, ultra-reliable low-latency communication (ultra reliable & low latency communication, uRLLC), and massive machine-type communications (massive machine type communication, mMTC). These scenarios may include but are not limited to a scenario of communication between communications devices, a scenario of communication between network devices, a scenario of communication between a network device and a communications device, and the like. The following provides descriptions by using an example in which the technical solutions are applied to a scenario in which a network device communicates with a terminal.

FIG. 1 is a schematic architectural diagram of a communications system to which technical solutions provided in this application are applicable. The communications system may include one or more network devices (where FIG. 1 shows only two network devices) and one or more terminals (where FIG. 1 shows only one terminal). The plurality of network devices may communicate with a same terminal by using a CoMP technology.

Figure 2:
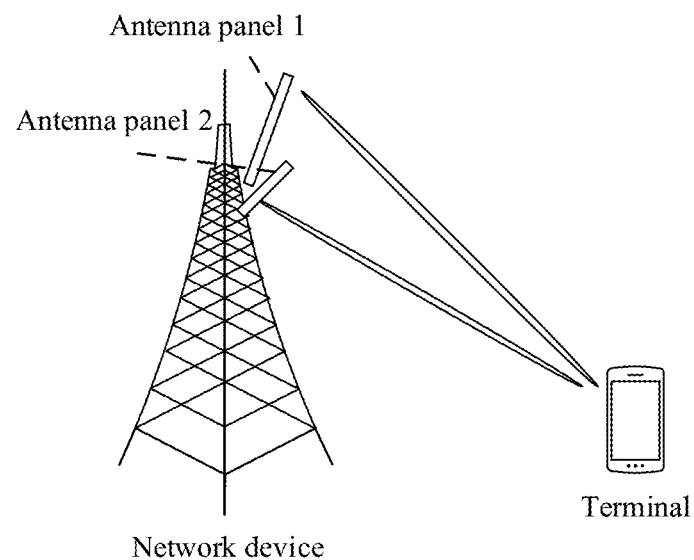
FIG. 2 is a schematic architectural diagram of another communications system according to an embodiment of this application.

FIG. 2 is a schematic architectural diagram of a communications system to which technical solutions provided in this application are applicable. The communications system may include one or more network devices (where FIG. 2 shows only one network device) and one or more terminals (where FIG. 2 shows only one terminal). The network device has configured a plurality of antenna panels, and the network device may communicate with the terminal by using the plurality of antenna panels. It may be understood that if phase calibration is not performed on the plurality of antenna panels configured by the network device, the plurality of antenna panels can be used only for non-coherent transmission. In other words, antenna ports on different antenna panels are non-quasi co-located.

It should be noted that FIG. 1 and FIG. 2 are merely schematic diagrams, and do not constitute a limitation on an applicable scenario of the technical solutions provided in this application.

The network device may be a base station, a base station controller, or the like in wireless communication. For example, the base station may include various types of base stations, for example, a micro base station (also referred to as a small cell), a macro base station, a relay station, an access point, and a TRP. This is not specifically limited in the embodiments of this application. In the embodiments of this application, the base station may be a base transceiver station (base transceiver station, BTS) in a global system for mobile communications (global system for mobile communication, GSM), code division multiple access (code division multiple access, CDMA), a NodeB (node B) in a wideband code division multiple access (wideband code division multiple access, WCDMA), an evolved NodeB (evolutional node B, eNB or e-NodeB) in LTE, an eNB in an internet of things (internet of things, IoT) or a narrowband internet of things (narrow band-internet of things, NB-IoT), or a base station in a future 5G mobile communications network or a future evolved public land mobile network (public land mobile network, PLMN). This is not limited in the embodiments of this application.

The terminal is configured to provide a voice and/or data connectivity service for a user. The terminal may have different names, for example, user equipment (user equipment, UE), an access terminal, a terminal unit, a terminal station, a mobile station, a mobile station, a remote station, a remote terminal, a mobile device, a wireless communications device, a terminal agent, or a terminal apparatus. Optionally, the terminal may be any type of handheld device, vehicle-mounted device, wearable device, or computer that has a communication function. This is not limited in the embodiments of this application. For example, the handheld device may be a smart phone. The vehicle-mounted device may be an in-vehicle navigation system. The wearable device may be a smart band. The computer may be a personal digital assistant (personal digital assistant, PDA) computer, a tablet computer, or a laptop computer (laptop computer).

Figure 3:
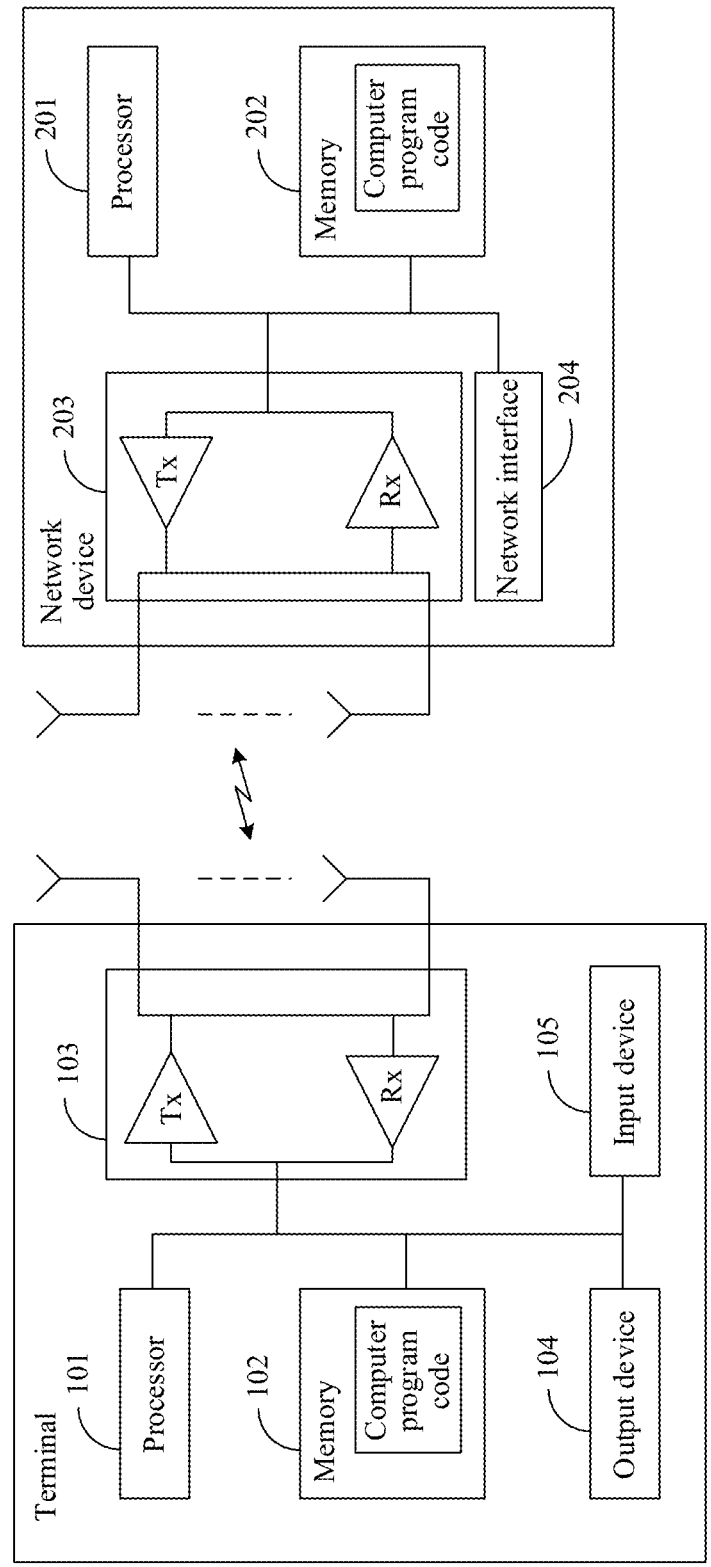
FIG. 3 is a schematic diagram of hardware structures of a terminal and a network device according to an embodiment of this application.

FIG. 3 is a schematic diagram of hardware structures of a network device and a terminal according to an embodiment of this application.

The terminal includes at least one processor 101 and at least one transceiver 103. Optionally, the terminal may further include an output device 104, an input device 105, and at least one memory 102.

The processor 101, the memory 102, and the transceiver 103 are connected through a bus. The processor 101 may be a general-purpose central processing unit (central processing unit, CPU), a microprocessor, an application-specific integrated circuit (application-specific integrated circuit, ASIC), or one or more integrated circuits configured to control program execution of the solutions of this application. The processor 101 may further include a plurality of CPUs, and the processor 101 may be a single-core (single-CPU) processor or a multi-core (multi-CPU) processor. The processor herein may be one or more devices, circuits, or processing cores configured to process data (for example, computer program instructions).

The memory 102 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. This is not limited in the embodiments of this application. The memory 102 may exist independently, and is connected to the processor 101 through the bus. Alternatively, the memory 102 may be integrated with the processor 101. The memory 102 is configured to store application program code for performing the solutions in this application, and the processor 101 controls the execution. The processor 101 is configured to execute the computer program code stored in the memory 102, to implement a method provided in the embodiments of this application.

The transceiver 103 may use any apparatus such as a transceiver, and is configured to communicate with another device or a communications network such as an Ethernet, a radio access network (radio access network, RAN), or a wireless local area network (wireless local area networks, WLAN). The transceiver 103 includes a transmitter Tx and a receiver Rx.

The output device 104 communicates with the processor 101, and may display information in a plurality of manners. For example, the output device 104 may be a liquid crystal display (liquid crystal display, LCD), a light emitting diode (light emitting diode, LED) display device, a cathode ray tube (cathode ray tube, CRT) display device, or a projector (projector). The input device 105 communicates with the processor 101, and may receive an input from a user in a plurality of manners. For example, the input device 105 may be a mouse, a keyboard, a touchscreen device, a sensor device, or the like.

The network device includes at least one processor 201, at least one memory 202, at least one transceiver 203, and at least one network interface 204. The processor 201, the memory 202, the transceiver 203, and the network interface 204 are connected through a bus. The network interface 204 is configured to connect to a core network device through a link (for example, an Si interface), or connect to a network interface of another network device through a wired or wireless link (for example, an X2 interface) (not shown in the figure). This is not specifically limited in the embodiments of this application. In addition, for related descriptions of the processor 201, the memory 202, and the transceiver 203, refer to the descriptions of the processor 101, the memory 102, and the transceiver 103 in the terminal. Details are not described herein again.

The following describes the technical solutions in the embodiments of this application with reference to the accompanying drawings in the embodiments of this application.

Figure 4:
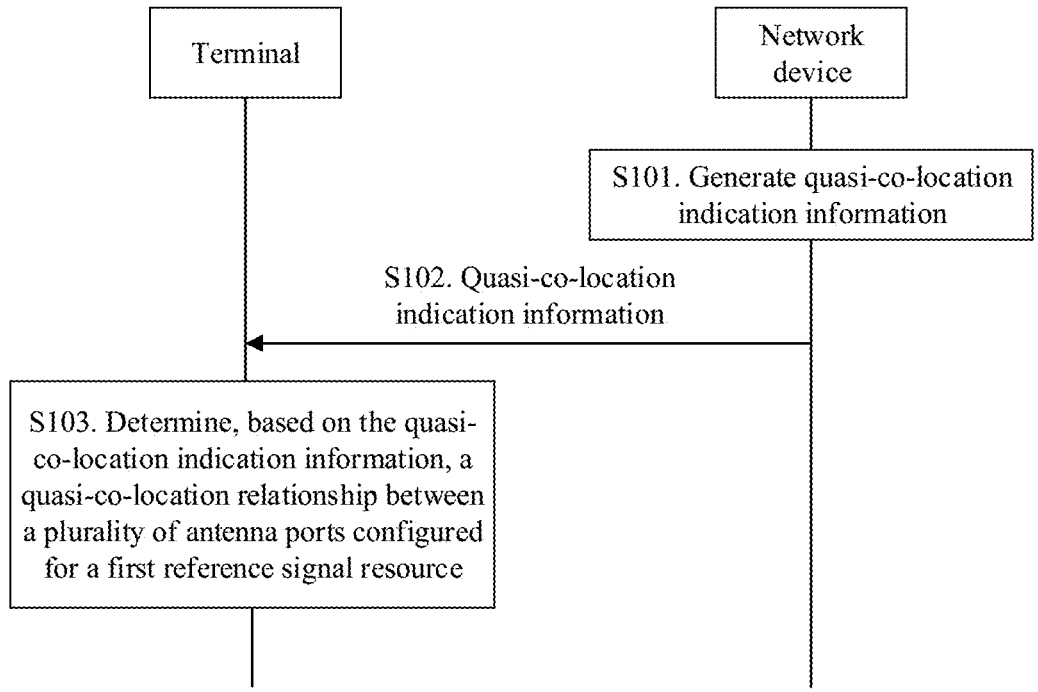
FIG. 4 is a first flowchart of a quasi-co-location indication method according to an embodiment of this application.

FIG. 4 shows a quasi-co-location indication method according to an embodiment of this application. The method includes the following steps.

S101. A network device generates quasi-co-location indication information.

The quasi-co-location indication information is used to indicate M antenna port groups corresponding to a first reference signal resource. M is an integer greater than 1. Any two antenna ports in a same antenna port group are in a quasi-co-location relationship, and antenna ports in different antenna port groups are not in a quasi-co-location relationship.

In this embodiment of this application, the first reference signal resource is a resource for a first reference signal. Optionally, the first reference signal is a CSI-RS. This embodiment of this application is not limited thereto.

In an implementation, each of the M antenna port groups includes one or more antenna ports of the first reference signal resource.

In this case, the quasi-co-location indication information includes at least one of the following cases.

(1-1) The quasi-co-location indication information includes information about the M antenna port groups, and the information about the antenna port group includes port numbers of a plurality of antenna ports. Optionally, the information about the antenna port group further includes an identifier of the antenna port group.

For example, it is assumed that an antenna port #0 to an antenna port #3 are configured for the first reference signal resource. If the quasi-co-location indication information includes information about two antenna port groups, where information about an antenna port group 1 includes a port number of the antenna port #2 and a port number of the antenna port #3, and information about an antenna port group 2 includes a port number of the antenna port #0 and a port number of the antenna port #1, a terminal may determine that the antenna port group 1 is {the antenna port #2, the antenna port #3}, and the antenna port group 2 is {the antenna port #0, the antenna port #1}.

(1-2) The quasi-co-location indication information includes information about the M antenna port groups, and the information about the antenna port group is used to indicate a quantity of antenna ports included in the antenna port group.

In this case, a terminal determines, based on the quasi-co-location indication information and according to a preset rule, an antenna port included in each of the M antenna port groups.

For example, the preset rule is as follows: grouping an indicated quantity of antenna ports into a corresponding antenna port group in ascending order of port numbers of the antenna ports. The indicated quantity is the quantity, indicated by the information about the antenna port group, of antenna ports included in the antenna port group.

For example, it is assumed that an antenna port #0 to an antenna port #4 are configured for the first reference signal resource. If the quasi-co-location indication information includes information about an antenna port group 1 and information about an antenna port group 2, where the information about the antenna port group 1 is used to indicate that the antenna port group 1 includes two antenna ports, and the information about the antenna port group 2 is used to indicate that the antenna port group 2 includes three antenna ports, the terminal may determine that the antenna port group 1 is {the antenna port #0, the antenna port #1}, and the antenna port group 2 is {the antenna port #2, the antenna port #3, the antenna port #4}.

For example, the preset rule is as follows: grouping an indicated quantity of antenna ports into a corresponding antenna port group in descending order of port numbers of the antenna ports.

For example, it is assumed that an antenna port #0 to an antenna port #4 are configured for the first reference signal resource. If the quasi-co-location indication information includes information about an antenna port group 1 and information about an antenna port group 2, where the information about the antenna port group 1 is used to indicate that the antenna port group 1 includes two antenna ports, and the information about the antenna port group 2 is used to indicate that the antenna port group 2 includes three antenna ports, the terminal may determine that the antenna port group 1 is {the antenna port #3, the antenna port #4}, and the antenna port group 2 is {the antenna port #0, the antenna port #1, the antenna port #2}.

In addition, it should be noted that the information about the M antenna port groups may be jointly encoded, or may be separately encoded. It can be understood that, when joint encoding is used, there is an association relationship between the information about the M antenna port groups and indication information, so that the network device may indicate information about at least two antenna port groups by using one piece of indication information.

(1-3) The quasi-co-location indication information is further used to indicate a value of M.

In this case, a terminal determines, based on the quasi-co-location indication information, a quantity of antenna ports of the first reference signal resource, and a preset correspondence, a port number of an antenna port included in each of the M antenna port groups.

The preset correspondence is used to indicate the port number of the antenna port included in each of the M antenna port groups. It should be noted that the preset correspondence may be preconfigured by the network device for the terminal, or defined in a protocol.

For example, for the preset correspondence, refer to Table 2. It should be noted that, in Table 2, P indicates the quantity of antenna ports of the first reference signal resource. It can be understood that the quantity of antenna ports of the first reference signal resource is indicated by configuration information of the first reference signal resource.

TABLE 2

| Antenna port group index | M = 2, P = 4 | M = 4, P = 8 |
|---|---|---|
| Antenna port group 1 | Antenna port #0, antenna port #1 | Antenna port #0, antenna port #1 |
| Antenna port group 2 | Antenna port #2, antenna port #3 | Antenna port #2, antenna port #3 |
| Antenna port group 3 | | Antenna port #4, antenna port #5 |
| Antenna port group 4 | | Antenna port #6, antenna port #7 |
| ... | | |

An example is described with reference to Table 2. It is assumed that the quantity of antenna ports of the first reference signal resource is 4, and the quasi-co-location indication information indicates that the value of M is 2. In this case, referring to the $2^{nd}$ column in Table 2, the terminal may determine that the antenna port group 1 is {the antenna port #0, the antenna port #1}, and the antenna port group 2 is {the antenna port #2, the antenna port #3}.

An example is described with reference to Table 2. It is assumed that the quantity of antenna ports of the first reference signal resource is 8, and the quasi-co-location indication information indicates that the value of M is 4. In this case, referring to the $3^{rd}$ column in Table 2, the terminal may determine that the antenna port group 1 is {the antenna port #0, the antenna port #1}, the antenna port group 2 is {the antenna port #2, the antenna port #3}, the antenna port group 3 is {the antenna port #4, the antenna port #5}, and the antenna port 4 is {the antenna port #6, the antenna port #7}.

In another implementation, each of the M antenna port groups includes one or more CDM groups of the first reference signal resource.

It should be noted that, if a plurality of antenna ports in one CDM group are not in a quasi-co-location relationship, code division orthogonality of reference signals sent by the plurality of antenna ports in the CDM group is affected due to channel differences, thereby affecting channel estimation by a terminal. Therefore, in this embodiment of this application, an antenna port group is obtained through grouping based on a CDM group, thereby ensuring that all antenna ports in the CDM group belong to a same antenna port group. To be specific, it is ensured that all the antenna ports in the CDM group are in a quasi-co-location relationship, thereby avoiding affecting orthogonality of signals sent by different antenna ports in the CDM group.

In this case, the quasi-co-location indication information includes at least one of the following cases.

(2-1) The quasi-co-location indication information includes information about the M antenna port groups, and the information about the antenna port group includes an identifier of one or more CDM groups.

For example, it is assumed that a CDM group #1 to a CDM group #3 are configured for the first reference signal resource, where the CDM group #1 is {an antenna port #0, an antenna port #1}, the CDM group #2 is {an antenna port #2, an antenna port #3}, and the CDM group #3 is {an antenna port #4, an antenna port #5}. If the quasi-co-location indication information includes information about two antenna port groups, where information about an antenna port group 1 includes an identifier of the CDM group #1 and an identifier of the CDM group #3, and information about an antenna port group 2 includes an identifier of the CDM group #2, the terminal may determine that the antenna port group 1 includes the CDM group #1 and the CDM group #3, that is, the antenna port group 1 is {the antenna port #0, the antenna port #1, the antenna port #4, the antenna port #5}; and the terminal may determine that the antenna port group 2 includes the CDM group #2, that is, the antenna port group 2 is {the antenna port #2, the antenna port #3}.

(2-2) The quasi-co-location indication information includes information about the M antenna port groups, and the information about the antenna port group is used to indicate a quantity of CDM groups included in the antenna port group.

In this case, the terminal determines, based on the quasi-co-location indication information and according to a preset rule, a CDM group included in each of the M antenna port groups.

For example, the preset rule is as follows: grouping an indicated quantity of CDM groups into a corresponding antenna port group in ascending order of identifiers of the CDM groups. The indicated quantity is the quantity, indicated by the information about the antenna port group, of CDM groups included in the antenna port group.

For example, it is assumed that a CDM group #0 to a CDM group #4 are configured for the first reference signal resource. If the quasi-co-location indication information includes information about an antenna port group 1 and information about an antenna port group 2, where the information about the antenna port group 1 is used to indicate that the antenna port group 1 includes two CDM groups, and the information about the antenna port group 2 is used to indicate that the antenna port group 2 includes three CDM groups, the terminal may determine that the antenna port group 1 is {the CDM group #0, the CDM group #1}, and the antenna port group 2 is {the CDM group #2, the CDM group #3, the CDM group #4}.

For example, the preset rule is as follows: grouping an indicated quantity of CDM groups into a corresponding antenna port group in descending order of identifiers of the CDM groups.

For example, it is assumed that a CDM group #0 to a CDM group #4 are configured for the first reference signal resource. If the quasi-co-location indication information includes information about an antenna port group 1 and information about an antenna port group 2, where the information about the antenna port group 1 is used to indicate that the antenna port group 1 includes two CDM groups, and the information about the antenna port group 2 is used to indicate that the antenna port group 2 includes three CDM groups, the terminal may determine that the antenna port group 1 is {the CDM group #3, the CDM group #4}, and the antenna port group 2 is {the CDM group #0, the CDM group #1, the CDM group #2}.

(2-3) The quasi-co-location indication information is further used to indicate a value of M.

In this case, the terminal determines, based on the quasi-co-location indication information, a quantity of antenna ports of the first reference signal resource, and a preset correspondence, an identifier of a CDM group included in each of the M antenna port groups.

The preset correspondence is used to indicate the identifier of the CDM group included in each of the M antenna port groups. It should be noted that the preset correspondence may be preconfigured by the network device for the terminal, or defined in a protocol.

For example, for the preset correspondence, refer to Table 3. It should be noted that, in Table 3, K indicates a quantity of CDM groups of the first reference signal resource. The quantity of CDM groups of the first reference signal resource is preconfigured by the network device, or defined in a protocol.

TABLE 3

| Antenna port group index | M = 2, K = 2 | M = 4, K = 8 |
| --- | --- | --- |
| Antenna port group 1 | CDM group #0 | CDM group #0, CDM group #1 |
| Antenna port group 2 | CDM group #1 | CDM group #2, CDM group #3 |
| Antenna port group 3 | | CDM group #4, CDM group #5 |
| Antenna port group 4 | | CDM group #6, CDM group #7 |
| . . . | | |

An example is described with reference to Table 3. It is assumed that the quantity of CDM groups of the first reference signal is 2, and the quasi-co-location indication information indicates that the value of M is 2. In this case, referring to the $2^{nd}$ column in Table 3, the terminal may determine that the antenna port group 1 includes the CDM group #0, and the antenna port group 2 includes the CDM group #1.

An example is described with reference to Table 3. It is assumed that the quantity of CDM groups of the first reference signal is 8, and the quasi-co-location indication information indicates that the value of M is 4. In this case, referring to the $3^{rd}$ column in Table 3, the terminal may determine that the antenna port group 1 includes the CDM group #0 and the CDM group #1, the antenna port group 2 includes the CDM group #2 and the CMD group #3, the antenna port group 3 includes the CDM group #4 and the CDM group #5, and the antenna port group 4 includes the CDM group #6 and the CDM group #7.

(2-4) The quasi-co-location indication information is further used to indicate a grouping manner of CDM groups, and the grouping manner includes at least one of a time domain grouping manner and a frequency domain grouping manner.

In this case, the terminal determines, based on the grouping manner and resource pattern information of a CDM group of the first reference signal resource, a CDM group included in each of the M antenna port groups. The resource pattern information of the CDM group is used to indicate a time domain resource corresponding to each CDM group of the first reference signal resource.

In this embodiment of this application, the quasi-co-location indication information may indicate the grouping manner by using at least one bit. For example, "0" indicates that the grouping manner is the time domain grouping manner, and "1" indicates that the grouping manner is the frequency domain grouping manner.

In the time domain grouping manner, CDM groups on one time domain resource are grouped into one antenna port group. Optionally, the time domain resource includes one or more orthogonal frequency division multiplexing (orthogonal frequency division multiplexing, OFDM) symbols.

Figure 5:
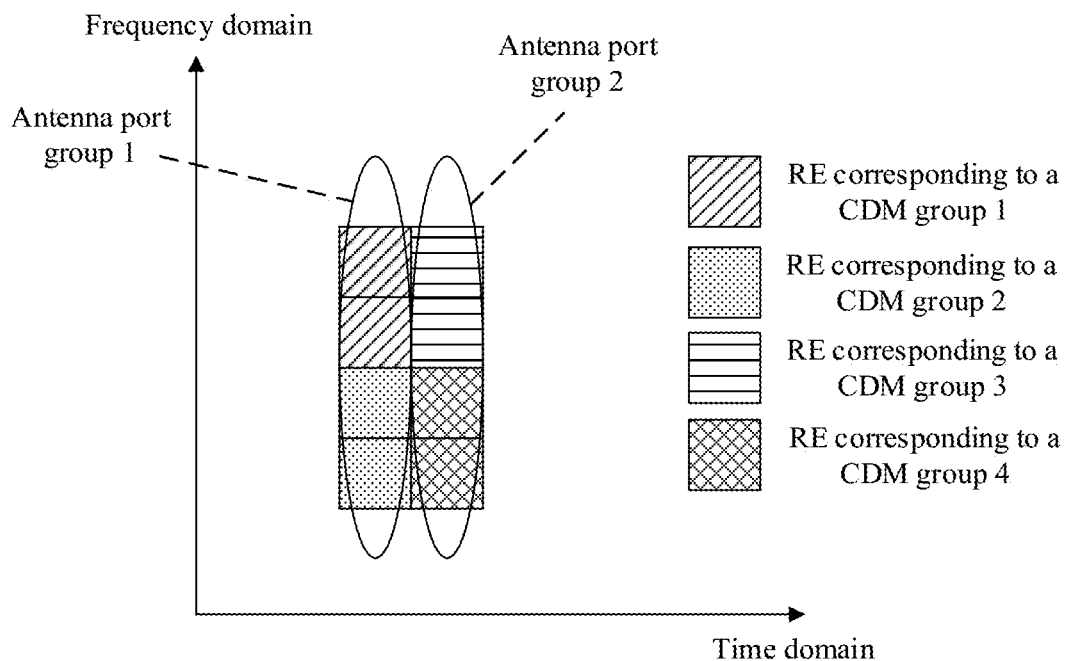
FIG. 5 is a schematic grouping diagram of CDM groups according to an embodiment of this application.

An example is described with reference to FIG. 5. A CDM group #1 and a CDM group #2 are located on one time domain resource, and a CDM group #3 and a CDM group #4 are located on one time domain resource. If the quasi-co-location indication information indicates that the grouping manner of CDM groups is the time domain grouping manner, the terminal may determine that the CDM group #1 and the CDM group #2 belong to an antenna port group 1, and the CDM group #3 and the CDM group #4 belong to an antenna port group 2.

In the frequency domain grouping manner, CDM groups on one frequency domain resource are grouped into one antenna port group. Optionally, the frequency domain resource includes one or more subcarriers.

Figure 6:
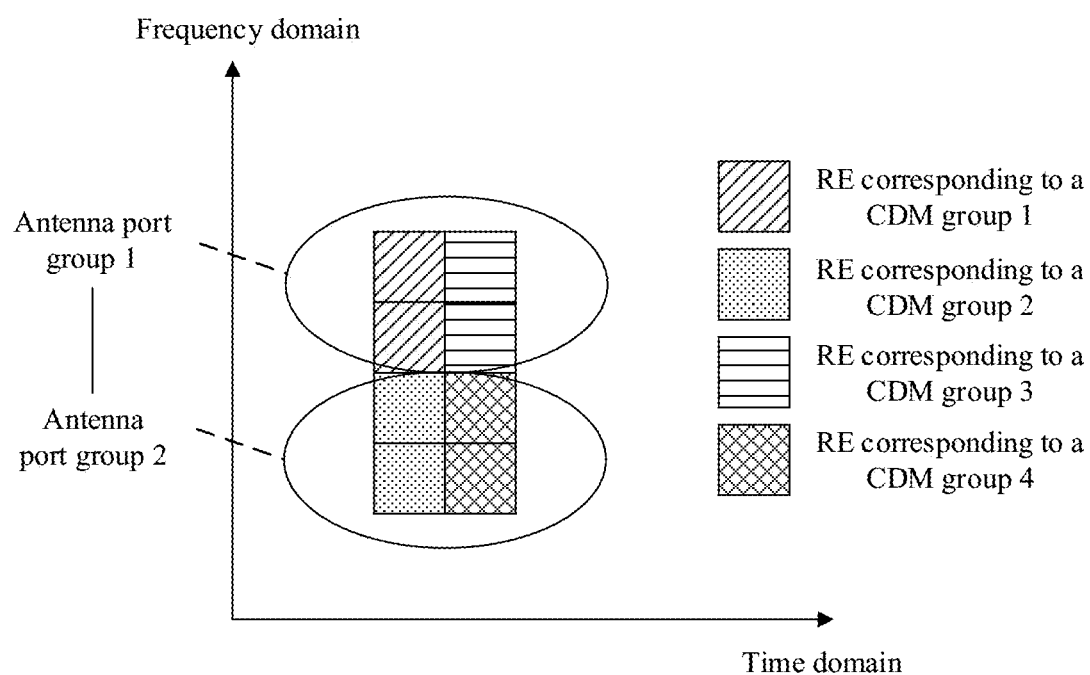
FIG. 6 is another schematic grouping diagram of CDM groups according to an embodiment of this application.

An example is described with reference to FIG. 6. A CDM group #1 and a CDM group #3 are located on one frequency domain resource, and a CDM group #2 and a CDM group #4 are located on one frequency domain resource. If the quasi-co-location indication information indicates that the grouping manner of CDM groups is the frequency domain grouping manner, the terminal may determine that the CDM group #1 and the CDM group #3 belong to an antenna port group 1, and the CDM group #2 and the CDM group #4 belong to an antenna port group 2.

It should be noted that the time domain grouping manner and the frequency domain grouping manner may be used together. For ease of description, a manner in which the time domain grouping manner and the frequency domain grouping manner are used together may be referred to as a time-frequency grouping manner. In the time-frequency grouping manner, CDM groups on one time-frequency resource are grouped into one antenna port group. Optionally, the time-frequency resource includes one or more REs. Optionally, the time-frequency grouping manner is applicable to a scenario in which the first reference signal resource includes a comparatively large quantity of antenna ports. For example, the first reference signal resource includes 32 or more antenna ports.

The cases (1-1) to (1-3) or the cases (2-1) to (2-4) are merely examples of the quasi-co-location indication information. This embodiment of this application is not limited thereto.

S102. The network device sends the quasi-co-location indication information to the terminal, so that the terminal receives the quasi-co-location indication information.

Optionally, the quasi-co-location indication information is carried in radio resource control (radio resource control, RRC) signaling, media access control (media access control, MAC)-control element (control element, CE) signaling, or downlink control information (downlink control information, DCI).

In addition, the quasi-co-location indication information may be carried in existing signaling or new signaling. It can be understood that, if the quasi-co-location indication information is carried in existing signaling, a new field is used in the existing signaling to carry the quasi-co-location indication information, or an existing field in the existing signaling is reused to carry the quasi-co-location indication information.

For example, the quasi-co-location indication information is carried in existing signaling. The quasi-co-location indication information may be carried in at least one of a CSI request field, an SRS request field, a transmission configuration indicator (transmission configuration indicator, TCI) field, an SRS resource indicator field, and a rate matching indicator field of DCI.

For example, the quasi-co-location indication information is carried in new signaling. The new signaling may be included in configuration information of a CSI-RS resource.

S103. The terminal determines, based on the quasi-co-location indication information, a quasi-co-location relationship between a plurality of antenna ports configured for the first reference signal resource.

It can be understood that, that the terminal determines a quasi-co-location relationship between a plurality of antenna ports of the first reference signal resource means that the terminal determines which antenna ports of the first reference signal resource are in a quasi-co-location relationship and which antenna ports are not in a quasi-co-location relationship.

According to the technical solution shown in FIG. 4, the network device delivers the quasi-co-location indication information, so that the terminal learns of the M antenna port groups corresponding to the first reference signal resource. Therefore, for the plurality of antenna ports of the first reference signal resource, the terminal may determine, by determining whether two antenna ports belong to a same antenna port group, whether the two antenna ports are quasi-co-located. By analogy, the terminal may learn of the quasi-co-location relationship between the plurality of antenna ports of the first reference signal resource.

Figure 7:
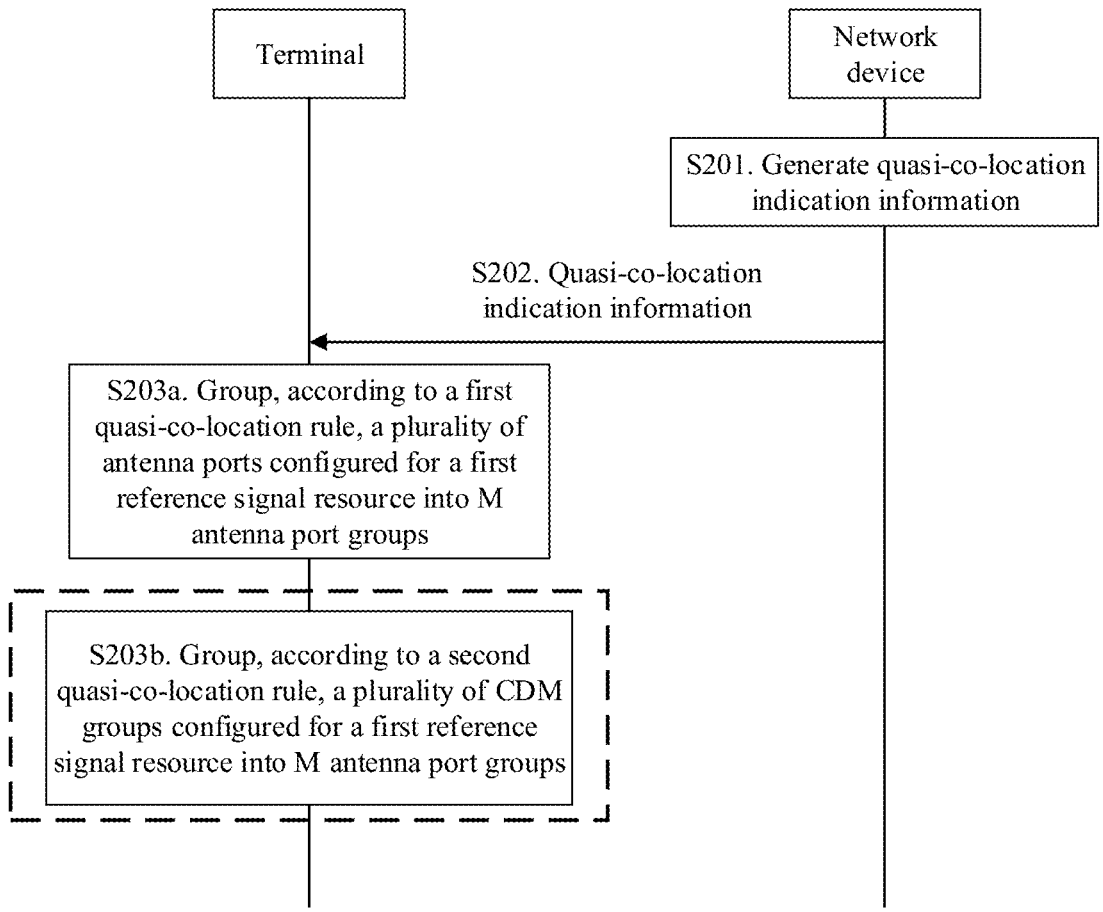
FIG. 7 is a second flowchart of a quasi-co-location indication method according to an embodiment of this application.

FIG. 7 shows another quasi-co-location indication method according to an embodiment of this application. The method includes the following steps.

S201. A network device generates quasi-co-location indication information corresponding to a first reference signal resource.

Optionally, the quasi-co-location indication information is used to indicate that at least two of a plurality of antenna ports of the first reference signal resource are not in a quasi-co-location relationship.

In an implementation, the quasi-co-location indication information is used to indicate that both a channel measurement resource and an interference measurement resource are the first reference signal resource. It can be understood that, because the first reference signal resource serves as both the channel measurement resource and the interference measurement resource, in the plurality of antenna ports of the first reference signal resource, signals sent by some antenna ports are interference signals for other antenna ports. Therefore, the terminal may determine that at least two of the plurality of antenna ports of the first reference signal resource are not in a quasi-co-location relationship.

S202. This step is similar to step S102. For detailed descriptions, refer to step S102. Details are not described herein again.

S203a. Group, according to a first quasi-co-location rule, the plurality of antenna ports configured for the first reference signal resource into M antenna port groups.

Each of the M antenna port groups includes one or more antenna ports.

Optionally, a value of M is defined in a protocol. Manner 1: A protocol may directly define the value of M. For example, it is defined in a protocol that the value of M is 2. Manner 2: A protocol may define a correspondence between the value of M and a quantity of antenna ports of the first reference signal resource. Therefore, the terminal may determine the value of M based on the quantity of antenna ports of the first reference signal resource. For example, the correspondence between the value of M and the quantity of antenna ports of the first reference signal resource may be shown in Table 4. In Table 4, P indicates the quantity of antenna ports of the first reference signal resource.

TABLE 4

| Value of P | Value of M |
|---|---|
| 4 | 2 |
| 8 | 4 |
| 16 | 4 |

Optionally, a quantity of antenna ports included in each of the M antenna port groups is also defined in a protocol; or a quantity of antenna ports included in each of the M antenna port groups is determined based on the value of M and the quantity of antenna ports of the first reference signal resource.

It should be noted that the first quasi-co-location rule is preconfigured, or defined in a protocol. Optionally, when the first quasi-co-location rule is preconfigured, the quasi-co-location indication information further includes information about the first quasi-co-location rule, and the information about the first quasi-co-location rule may be an index of the first quasi-co-location rule, an identifier of the first quasi-co-location rule, or the like.

For example, the first quasi-co-location rule includes at least one of the following rules.

Rule 1: Group a preset quantity of antenna ports into one antenna port group in ascending order of port numbers of the antenna ports.

For example, assuming that the preset quantity is 2, and an antenna port #0 to an antenna port #3 are configured for the first reference signal resource, the terminal groups the antenna port #0 and the antenna port #1 into one antenna port group, and groups the antenna port #2 and the antenna port #3 into one antenna port group. In other words, the terminal may determine that a first antenna port group is {the antenna port #0, the antenna port #1}, and a second antenna port group is {the antenna port #2, the antenna port #3}.

Rule 2: Group a preset quantity of antenna ports into one antenna port group in descending order of port numbers of the antenna ports.

For example, assuming that the preset quantity is 2, and an antenna port #0 to an antenna port #7 are configured for the first reference signal resource, the terminal groups the antenna port #7 and the antenna port #6 into one antenna port group, groups the antenna port #5 and the antenna port #4 into one antenna port group, groups the antenna port #3 and the antenna port #2 into one antenna port group, and groups the antenna port #1 and the antenna port #0 into one antenna port group. In other words, the terminal may determine that a first antenna port group is {the antenna port #6, the antenna port #7}, a second antenna port group is {the antenna port #4, the antenna port #5}, a third antenna port group is {the antenna port #2, the antenna port #3}, and a fourth antenna port group is {the antenna port #0, the antenna port #1}.

The rule 1 and the rule 2 are merely examples of the first quasi-co-location rule. This embodiment of this application is not limited thereto.

It can be understood that, as shown in Table 5, the first quasi-co-location rule may be alternatively implemented in a form of a table. In Table 5, P is the quantity of antenna ports of the first reference signal resource.

TABLE 5

| Antenna port group index | P = 4 | P = 8 |
|---|---|---|
| Antenna port group 1 | Antenna port #0, antenna port #1 | Antenna port #0, antenna port #1 |
| Antenna port group 2 | Antenna port #2, antenna port #3 | Antenna port #2, antenna port #3 |
| Antenna port group 3 | | Antenna port #4, antenna port #5 |
| Antenna port group 4 | | Antenna port #6, antenna port #7 |
| . . . | | |

In this case, after the terminal receives the quasi-co-location indication information, the terminal groups the plurality of antenna ports of the first reference signal resource into the M antenna port groups according to the first quasi-co-location rule and based on the quantity of antenna ports of the first reference signal resource.

Optionally, step S203a may be replaced with step S203b.

S203b. Group, according to a second quasi-co-location rule, a plurality of CDM groups configured for the first reference signal resource into M antenna port groups.

It can be understood that each of the M antenna port groups includes one or more CDM groups. Because the CDM group includes a plurality of antenna ports, each of the M antenna port groups includes a plurality of antenna ports.

The second quasi-co-location rule is preconfigured, or defined in a protocol. Optionally, when the second quasi-co-location rule is preconfigured, the quasi-co-location indication information further includes information about the second quasi-co-location rule, and the information about the second quasi-co-location rule may be an index of the second quasi-co-location rule, an identifier of the second quasi-co-location rule, or the like.

For example, the second quasi-co-location rule includes at least one of the following rules.

Rule 1: Group a preset quantity of CDM groups into one antenna port group in ascending order of identifiers of the CDM groups.

For example, assuming that the preset quantity is 2, and a CDM group #0 to a CDM group #3 are configured for the first reference signal resource, the terminal groups the CDM group #0 and the CDM group #1 into one antenna port group, and groups the CDM group #2 and the CDM group #3 into one antenna port group. In other words, the terminal may determine that a first antenna port group is {the CDM group #0, the CDM group #1}, and a second antenna port group is {the CDM group #2, the CDM group #3}.

Rule 2: Group a preset quantity of CDM groups into one antenna port group in descending order of identifiers of the CDM groups.

For example, assuming that the preset quantity is 2, and a CDM group #0 to a CDM group #7 are configured for the first reference signal resource, the terminal groups the CDM group #7 and the CDM group #6 into one antenna port group, groups the CDM group #5 and the CDM group #4 into one antenna port group, groups the CDM group #3 and the CDM group #2 into one antenna port group, and groups the CDM group #1 and the CDM group #0 into one antenna port group. In other words, the terminal may determine that a first antenna port group is {the CDM group #6, the CDM group #7}, a second antenna port group is {the CDM group #4, the CDM group #5}, a third antenna port group is {the CDM group #2, the CDM group #3}, and a fourth antenna port group is {the CDM group #0, the CDM group #1}.

The rule 1 and the rule 2 are merely examples of the second quasi-co-location rule. This embodiment of this application is not limited thereto.

It can be understood that, as shown in Table 6, the second quasi-co-location rule may be alternatively implemented in a form of a table. In Table 6, K is a quantity of CDM groups of the first reference signal resource.

TABLE 6

| Antenna port group index | K = 4 | K = 8 |
| --- | --- | --- |
| Antenna port group 1 | CDM group #0, CDM group #1 | CDM group #0, CDM group #1 |
| Antenna port group 2 | CDM group #2, CDM group #3 | CDM group #2, CDM group #3 |

TABLE 6-continued

| Antenna port group index | K = 4 | K = 8 |
| --- | --- | --- |
| Antenna port group 3 | | CDM group #4, CDM group #5 |
| Antenna port group 4 | | CDM group #6, CDM group #7 |
| ... | | |

In this case, after the terminal receives the quasi-co-location indication information, the terminal groups the plurality of CDM groups of the first reference signal resource into the M antenna port groups according to the second quasi-co-location rule and based on the quantity of CDM groups of the first reference signal resource.

According to the technical solution shown in FIG. 7, the network device sends the quasi-co-location indication information, so that the terminal learns that any two of the plurality of antenna ports of the first reference signal resource are not necessarily in a quasi-co-location relationship, and the terminal determines the M antenna port groups according to a preset quasi-co-location rule. Therefore, for the plurality of antenna ports of the first reference signal resource, the terminal may determine, by determining whether two antenna ports belong to a same antenna port group, whether the two antenna ports are quasi-co-located. By analogy, the terminal may learn of a quasi-co-location relationship between the plurality of antenna ports of the first reference signal resource.

Figure 8:
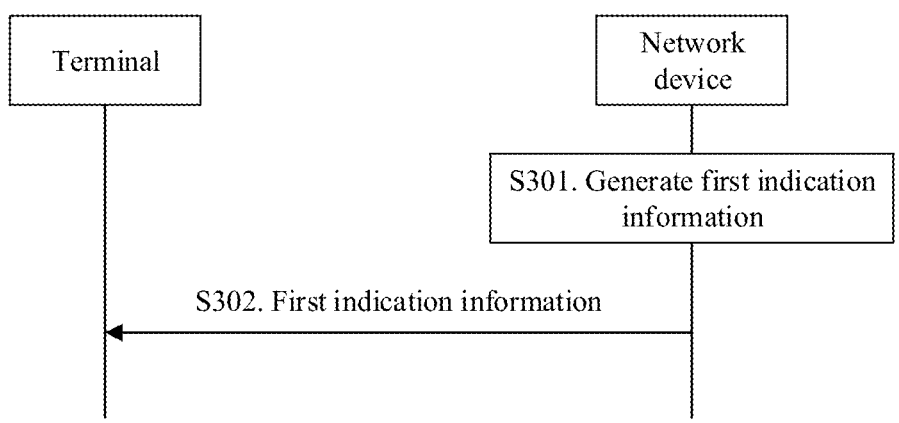
FIG. 8 is a third flowchart of a quasi-co-location indication method according to an embodiment of this application.

FIG. 8 shows another quasi-co-location indication method according to an embodiment of this application. The method includes the following steps.

S301. A network device generates first indication information.

The first indication information is used to indicate an antenna port group that is of a second reference signal resource and that has a quasi-co-location relationship with an antenna port group of a first reference signal resource. It can be understood that, that two antenna port groups are in a quasi-co-location relationship indicates that antenna ports included in the two antenna port groups are in a quasi-co-location relationship. In this case, the first indication information includes at least one of the following parameters: an index of the first reference signal resource, an identifier of the antenna port group of the first reference signal resource, an index of the second reference signal resource, and an identifier of the antenna port group of the second reference signal resource.

Alternatively, the first indication information is used to indicate an antenna port that is of a second reference signal resource and that has a quasi-co-location relationship with an antenna port of the first reference signal resource. In this case, the first indication information includes at least one of the following parameters: an index of the first reference signal resource, a port number of the antenna port of the first reference signal resource, an index of the second reference signal resource, and a port number of the antenna port of the second reference signal resource.

It can be understood that the first indication information may not include the identifier of the antenna port group (or the port number of the antenna port) of the second reference signal resource. In this case, all antenna ports included of the second reference signal resource are in a quasi-co-location relationship with the antenna port group (or the antenna port) that is of the first reference signal resource and that corresponds to the first indication information.

It should be noted that the second reference signal resource is a resource for a second reference signal. For example, the second reference signal is a DMRS, a TRS, a CSI-RS, or an SRS. This embodiment of this application is not limited thereto. It can be understood that the first reference signal resource and the second reference signal resource are different reference signal resources. In other words, a type of the first reference signal resource is different from that of the second reference signal resource. For example, the first reference signal resource is a DMRS resource, and the second reference signal resource is a CSI-RS resource. Alternatively, an index of the first reference signal resource is different from that of the second reference signal resource. For example, the first reference signal resource is a CSI-RS resource #1, and the second reference signal resource is a CSI-RS resource #2.

In this embodiment of this application, the first indication information may indicate different types of second reference signal resources for different antenna port groups (or antenna ports) of the first reference signal resource. For example, the first indication information indicates that a second reference signal resource corresponding to an antenna port group 1 is a DMRS resource, and a second reference signal resource corresponding to an antenna port group 2 is a TRS resource.

In this embodiment of this application, the first indication information may indicate second reference signal resources with different indexes for different antenna port groups (or antenna ports) of the first reference signal resource. For example, the first indication information indicates that a second reference signal resource corresponding to an antenna port group 1 is a DMRS resource #1, and a second reference signal resource corresponding to an antenna port group 2 is a DMRS resource #2.

Optionally, the first indication information may serve as configuration information of the first reference signal resource. The first indication information includes information about the second reference signal resource, for example, the index of the second reference signal resource.

For example, the first reference signal resource is a CSI-RS resource, and configuration information of the CSI-RS resource includes the first indication information. The first indication information includes indexes of at least two second reference signal resources, for example, indexes of two CSI-RS resources. Alternatively, the first indication information includes an index of one second reference signal resource, and the second reference signal resource includes at least two antenna port groups conforming to a non-quasi-co-location assumption.

Optionally, the first indication information may serve as configuration information of the second reference signal resource. The first indication information includes information about the first reference signal resource, for example, includes the index of the first reference signal resource.

Optionally, the first indication information further includes a quasi-co-location type, and the quasi-co-location type is used to indicate a parameter included in large-scale information of a channel. For example, a quasi-co-location type 1 is used to indicate that the large-scale information of the channel includes a Doppler shift and a Doppler spread, and a quasi-co-location type 2 is used to indicate that the large-scale information of the channel includes an average channel gain and an average delay.

Optionally, if the first indication information does not include a quasi-co-location type, a parameter included in large-scale information of a channel is defined in a protocol.

S302. The network device sends the first indication information to a terminal, so that the terminal receives the first indication information.

The first indication information may be carried in one or a combination of at least two of RRC signaling, MAC signaling, and DCI.

In an implementation, the first indication information may be a TCI state (state).

According to the technical solution shown in FIG. 8, the terminal learns of, based on the first indication information, the antenna port (or the antenna port group) that is of the second reference signal resource and that has a quasi-co-location relationship with the antenna port (or the antenna port group) of the first reference signal resource. Therefore, the terminal may infer, from large-scale information of a channel for the antenna port (or the antenna port group) of the second reference signal resource, large-scale information of a channel for the antenna port (or the antenna port group) that is of the first reference signal resource and that has a quasi-co-location relationship with the antenna port (or the antenna port group) of the second reference signal resource.

Figure 9:
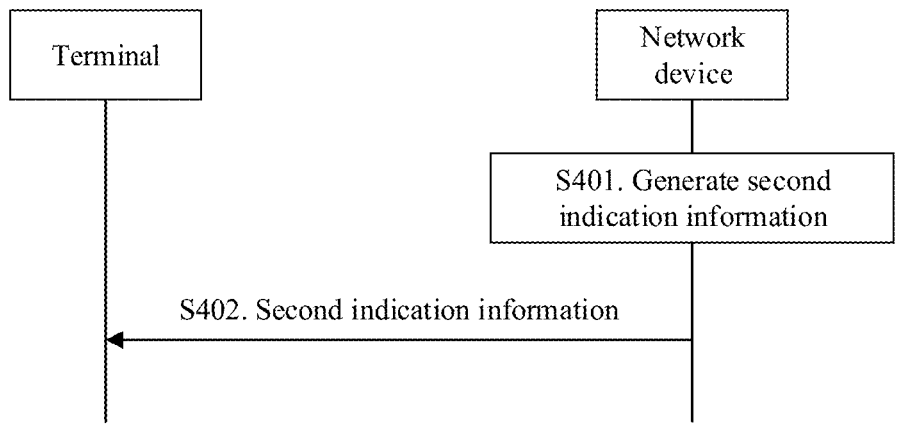
FIG. 9 is a fourth flowchart of a quasi-co-location indication method according to an embodiment of this application.

FIG. 9 shows another quasi-co-location indication method according to an embodiment of this application. The method includes the following steps.

S401. A network device generates second indication information.

The second indication information is used to indicate an antenna port group that is of a first reference signal resource and that has a quasi-co-location relationship with an antenna port group of a second reference signal resource. In this case, the second indication information includes at least one of the following parameters: an index of the first reference signal resource, an identifier of the antenna port group of the first reference signal resource, an index of the second reference signal resource, and an identifier of the antenna port group of the second reference signal resource.

Alternatively, the second indication information is used to indicate an antenna port that is of the first reference signal resource and that has a quasi-co-location relationship with an antenna port of a second reference signal resource. In this case, the second indication information includes at least one of the following parameters: an index of the first reference signal resource, an identifier of the antenna port group of the first reference signal resource, an index of the second reference signal resource, and an identifier of the antenna port group of the second reference signal resource.

In this embodiment of this application, the second indication information may indicate different types of first reference signal resources for different antenna port groups (or antenna ports) of the second reference signal resource. For example, the second indication information indicates that a first reference signal resource corresponding to an antenna port group 1 is a DMRS resource, and a first reference signal resource corresponding to an antenna port group 2 is a TRS resource.

In this embodiment of this application, the second indication information may indicate first reference signal resources with different indexes for different antenna port groups (or antenna ports) of the second reference signal resource. For example, the second indication information indicates that a first reference signal resource corresponding to an antenna port group 1 is a DMRS resource #1, and a first reference signal resource corresponding to an antenna port group 2 is a DMRS resource #2.

Optionally, the second indication information may serve as configuration information of the second reference signal resource. In this case, the second indication information includes information about the first reference signal resource, for example, the index of the first reference signal resource.

For example, the first reference signal resource is a CSI-RS resource, and the second reference signal resource is a DMRS resource. Therefore, configuration information of a PDSCH used to indicate DMRS reception includes the second indication information. The second indication information is used to indicate information about a CSI-RS resource that has a quasi-co-location relationship with a DMRS in the PDSCH. The quasi-co-location relationship includes a quasi-co-location relationship between at least two DMRS antenna port groups and at least two CSI-RS antenna port groups in the PDSCH. The at least two CSI-RS antenna port groups belong to the CSI-RS resource. In this case, the terminal may receive the PDSCH based on the quasi-co-location relationship indicated by the second indication information.

Optionally, the second indication information may serve as configuration information of the first reference signal resource. In this case, the first indication information includes information about the second reference signal resource, for example, the index of the second reference signal resource.

Optionally, the second indication information further includes a quasi-co-location type, and the quasi-co-location type is used to indicate a parameter included in large-scale information of a channel. Alternatively, if the second indication information does not include a quasi-co-location type, a parameter included in large-scale information of a channel is defined in a protocol.

S402. The network device sends the second indication information to a terminal, so that the terminal receives the second indication information.

The second indication information may be carried in one or a combination of at least two of RRC signaling, MAC signaling, and DCI.

In an implementation, the second indication information may be a TCI state.

According to the technical solution shown in FIG. 9, the terminal learns of, based on the second indication information, the antenna port (or the antenna port group) that is of the first reference signal resource and that has a quasi-co-location relationship with the antenna port (or the antenna port group) of the second reference signal resource. Therefore, the terminal may infer, from large-scale information of a channel for the antenna port (or the antenna port group) of the first reference signal resource, large-scale information of a channel for the antenna port (or the antenna port group) that is of the second reference signal resource and that has a quasi-co-location relationship with the antenna port (or the antenna port group) of the first reference signal resource.

Figure 10:
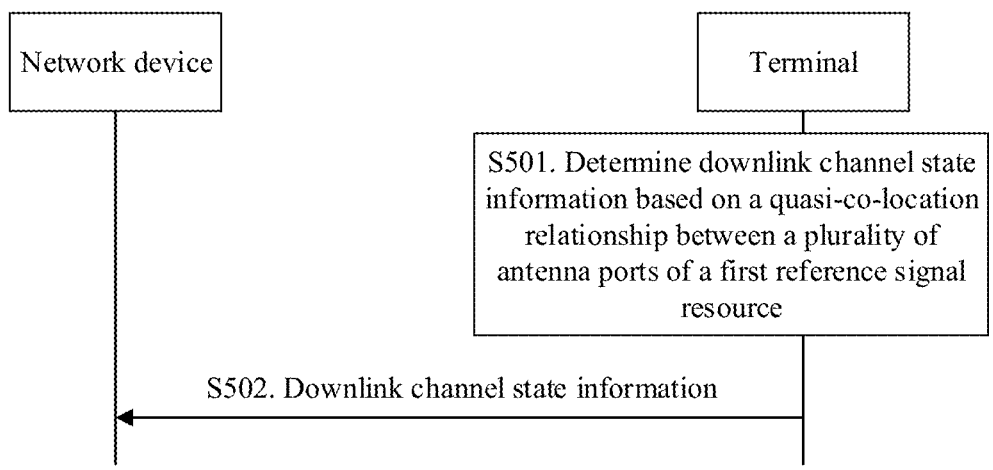
FIG. 10 is a flowchart of a method for reporting downlink channel state information according to an embodiment of this application.

FIG. 10 shows a method for reporting downlink channel state information according to an embodiment of this application. The method includes the following steps.

S501. A terminal determines downlink channel state information based on a quasi-co-location relationship between a plurality of antenna ports of a first reference signal resource.

The downlink channel state information includes at least one of the following parameters: a precoding matrix indicator (precoding matrix indicator, PMI), a rank indicator (rank indicator, RI), and a channel quality indicator (channel quality indicator, CQI).

The following briefly describes an idea of step S501.

In a single-cell spatial multiplexing scenario, each data stream may be transmitted by using each of P antenna ports, as shown in the following formula (1):

$$\begin{bmatrix} y^{(3000)}(i) \\ \dots \\ y^{(3000+p-1)}(i) \end{bmatrix} = W(i) \begin{bmatrix} x^{(0)}(i) \\ \dots \\ x^{(v-1)}(i) \end{bmatrix} \quad (1)$$

$x^{(0)}(i)$ to $x^{(v-1)}(i)$ are data on a layer 0 to a layer v−1 respectively, and $y^{(3000)}(i)$ to $y^{(3000+p-1)}(i)$ are data on an antenna port #3000 to an antenna port #(3000+p−1). It can be understood that v is a quantity of layers, and is equivalent to a quantity of data streams. 0 to v−1 are indexes of layers. 3000 to 3000+p−1 are port numbers of antenna ports. The indexes of the layers and the port numbers of the antenna ports are merely examples, and do not constitute a limitation on this embodiment of this application.

Optionally, p=[1,2,4,8,12,16,24,32], where p is a quantity of transmit antenna ports on a network side, for example, a quantity of CSI-RS antenna ports, that a network device expects the terminal to assume when the terminal performs channel measurement.

W(i) may be referred to as a weight matrix or a precoding matrix. Each element $w_{ij}$ in W(i) reflects a weight coefficient carried in a data stream i when the data stream i is mapped to an antenna port #(3000+j). $w_{ij}$ may be a complex number or a real number. $w_{ij}$ reflects an adjustment of a phase and/or an amplitude of a signal carried on the antenna port #(3000+j).

W(i) may be a precoding matrix selected by the terminal, or may be a predefined precoding matrix. This embodiment of this application is not limited thereto.

In addition, after performing channel measurement, the terminal may feed back a weight matrix to the network device. For example, the terminal quantizes the weight matrix by using a codebook (codebook), and determines a codeword that is in the codebook and that is closest to the weight matrix. Then the terminal feeds back indication information to the network device, and the indication information is used to indicate an index of the codeword. It can be understood that the indication information is a PMI.

For example, v=2 and p=8, and the formula (1) may be transformed into the following formula (2):

$$\begin{bmatrix} y^{(3000)}(i) \\ y^{(3001)}(i) \\ y^{(3002)}(i) \\ y^{(3003)}(i) \\ y^{(3004)}(i) \\ y^{(3005)}(i) \\ y^{(3006)}(i) \\ y^{(3007)}(i) \end{bmatrix} = \begin{bmatrix} w_{00} & w_{10} \\ w_{01} & w_{11} \\ w_{02} & w_{12} \\ w_{03} & w_{13} \\ w_{04} & w_{14} \\ w_{05} & w_{15} \\ w_{06} & w_{16} \\ w_{07} & w_{17} \end{bmatrix} \begin{bmatrix} x^{(0)}(i) \\ x^{(1)}(i) \end{bmatrix} \quad (2)$$

In a scenario with a plurality of TRPs or antenna panels, if antenna ports of the plurality of TRPs or antenna panels are not quasi-co-located, the plurality of TRPs or antenna panels can be used only for non-coherent transmission. In this case, one TRP or antenna panel can be used to transmit a data stream only of the TRP or antenna panel. In other words, a data stream of one TRP or antenna panel is not mapped to an antenna port of another TRP or antenna panel.

From a perspective of an antenna port, one TRP or antenna panel includes a plurality of quasi-co-located antenna ports, and the plurality of quasi-co-located antenna ports are used to send a data stream of the TRP or antenna panel, but are not used to send a data stream of another TRP or antenna panel.

Therefore, the terminal may make the following assumption on data stream transmission: In a precoding matrix, for a plurality of weight coefficients corresponding to one data stream, a weight coefficient corresponding to an antenna port used to send the data stream may be a non-zero element, and weight coefficients corresponding to antenna ports not used to send the data stream are all zero elements.

A correspondence between an antenna port group and a data stream is used to indicate a specific data stream sent by a plurality of quasi-co-located antenna ports. The correspondence between an antenna port group and a data stream is determined by the terminal, or determined by the network device through configuration, or defined in a protocol.

In this embodiment of this application, the terminal may assume a correspondence between an antenna port group and a data stream according to a preset rule. For example, the preset rule is using an antenna port group with a specific number for a specific data stream. For example, an antenna port group with a comparatively small number is used for a data stream transmitted by a DMRS group with a comparatively small number; or an antenna port group with a comparatively small number is used for all data streams transmitted by a DMRS port group to which a data stream with a smallest number belongs.

Optionally, the correspondence between an antenna port group and a data stream may be alternatively reported by the terminal. For example, the terminal sends indication information to the network device, so that the network device knows an assumption of the terminal on which CSI-RS antenna port group or CSI-RS antenna port groups transmits/transmit which data stream or data streams. The indication information may be jointly reported with an RI, or the indication information may be separately reported. In an implementation, the indication information may be CSI-RS resource indication information.

An example is described with reference to the formula (2). It is assumed that eight antenna ports are configured for a reference signal resource, the eight antenna ports are grouped into two antenna port groups, an antenna port group 1 is {an antenna port #3000, an antenna port #3001, an antenna port #3002, an antenna port #3003}, and an antenna port group 2 is {an antenna port #3004, an antenna port #3005, an antenna port #3006, an antenna port #3007}. It is assumed that the plurality of antenna ports in the antenna port group 1 are used to send a data stream #0, and the plurality of antenna ports in the antenna port group 2 are used to send a data stream #1. Therefore, in weight coefficients $w_{10}$ to $w_{17}$ corresponding to the data stream #1, the terminal may determine that $w_{10}$ corresponding to the antenna port #3000, $w_{11}$ corresponding to the antenna port #3001, $w_{12}$ corresponding to the antenna port #3002, and $w_{13}$ corresponding to the antenna port #3003 are all 0. Similarly, in weight coefficients $w_{00}$ to $w_{07}$ corresponding to the data stream #0, the terminal may determine that $w_{04}$ corresponding to the antenna port #3004, $w_{05}$ corresponding to the antenna port #3005, $w_{06}$ corresponding to the antenna port port #3006, and $w_{07}$ corresponding to the antenna port #3007 are all 0. Therefore, the formula (2) may be transformed into the following formula (3):

$$\begin{bmatrix} y^{(3000)}(i) \\ y^{(3001)}(i) \\ y^{(3002)}(i) \\ y^{(3003)}(i) \\ y^{(3004)}(i) \\ y^{(3005)}(i) \\ y^{(3006)}(i) \\ y^{(3007)}(i) \end{bmatrix} = \begin{bmatrix} w_{00} & 0 \\ w_{01} & 0 \\ w_{02} & 0 \\ w_{03} & 0 \\ 0 & w_{14} \\ 0 & w_{15} \\ 0 & w_{16} \\ 0 & w_{17} \end{bmatrix} \begin{bmatrix} x^{(0)}(i) \\ x^{(1)}(i) \end{bmatrix} \quad (3)$$

This means that a CSI-RS resource is divided into two antenna port groups, and antenna ports in different antenna port groups should not be assumed to be QCL. In this case, the terminal should not consider that antenna ports in different antenna port groups are capable of transmitting one data stream. In other words, weights, corresponding to one data stream, of two antenna ports in different antenna port groups should not all be non-zero values. Otherwise, a behavior, assumed by the terminal, of sending a data stream is inconsistent with an understanding of the network device. As a result, reported channel state information is inaccurate, and system performance is degraded.

To sum up, the terminal calculates a precoding matrix based on a correct quasi-co-location assumption for antenna ports and the assumption on data stream transmission, determines a PMI, and further determines a CQI.

S502. The terminal sends the downlink channel state information to the network device, so that the network device receives the downlink channel state information.

According to the method shown in FIG. 10, the terminal makes an appropriate quasi-co-location assumption based on the quasi-co-location relationship between the plurality of antenna ports of the first reference signal resource, and determines appropriate downlink channel state information, to ensure that a channel measurement result is correct.

The foregoing mainly describes the solutions provided in the embodiments of this application from a perspective of interaction between the network elements. It may be understood that, to implement the foregoing functions, each network element, for example, the network device and the terminal, includes a corresponding hardware structure and/or software module for performing each function. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the network device and the terminal may be obtained through division based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into modules is an example, and is merely logical function division. During actual implementation, another division manner may be used. An example in which each functional module is obtained through division based on each corresponding function is used below for description.

Figure 11:
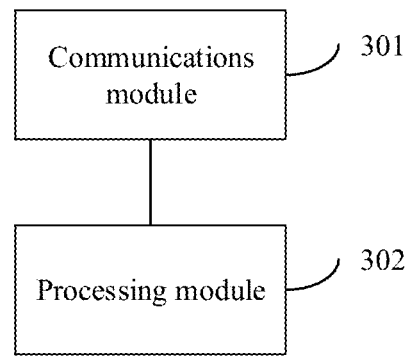
FIG. 11 is a schematic structural diagram of a terminal according to an embodiment of this application.

FIG. 11 is a schematic structural diagram of a terminal according to an embodiment of this application. As shown in FIG. 11, the terminal includes a communications module 301 and a processing module 302. The terminal may perform any one of the following actions.

Action 1: The communications module 301 is configured to receive quasi-co-location indication information corresponding to a first reference signal resource. The quasi-co-location indication information is used to indicate M antenna port groups. Each of the M antenna port groups includes one or more code division multiplexing (code division multiplexing, CDM) groups of the first reference signal resource. The CDM group includes a plurality of antenna ports. Any two antenna ports in a same antenna port group are in a quasi-co-location relationship. M is an integer greater than 1. The processing module 302 is configured to determine a quasi-co-location relationship between a plurality of antenna ports of the first reference signal resource based on the quasi-co-location indication information.

In the action 1, in a possible implementation, the quasi-co-location indication information includes information about the M antenna port groups. The information about the antenna port group includes an identifier of one or more CDM groups; or the information about the antenna port group is used to indicate a quantity of CDM groups included in the antenna port group.

In the action 1, in a possible implementation, the quasi-co-location indication information is further used to indicate a value of M.

In the action 1, in a possible implementation, the quasi-co-location indication information is further used to indicate a grouping manner of CDM groups, and the grouping manner includes at least one of a time domain grouping manner and a frequency domain grouping manner.

Action 2: The communications module 301 is configured to receive quasi-co-location indication information corresponding to a first reference signal resource. The quasi-co-location indication information is used to indicate M antenna port groups. Each of the M antenna port groups includes one or more antenna ports of the first reference signal resource. Any two antenna ports in a same antenna port group are in a quasi-co-location relationship. M is an integer greater than 1. The processing module 302 is configured to determine a quasi-co-location relationship between a plurality of antenna ports of the first reference signal resource based on the quasi-co-location indication information.

In the action 2, in a possible implementation, the quasi-co-location indication information includes information about the M antenna port groups. The information about the antenna port group includes port numbers of a plurality of antenna ports; or the information about the antenna port group is used to indicate a quantity of antenna ports included in the antenna port group.

In the action 2, in a possible implementation, the quasi-co-location indication information is further used to indicate a value of M.

Action 3: The communications module 301 is configured to receive quasi-co-location indication information corresponding to a first reference signal resource. The quasi-co-location indication information is used to indicate that at least two of a plurality of antenna ports of the first reference signal resource are not in a quasi-co-location relationship. The processing module 302 is configured to group the plurality of antenna ports of the first reference signal resource into M antenna port groups according to a first quasi-co-location rule, where M is an integer greater than 1.

In the action 3, in a possible implementation, the quasi-co-location indication information is used to indicate that both a channel measurement resource and an interference measurement resource are the first reference signal resource.

In the action 3, in a possible implementation, the quasi-co-location indication information further includes an index of the first quasi-co-location rule.

In the action 3, in a possible implementation, the first quasi-co-location rule includes one of the following rules: (1) grouping a preset quantity of antenna ports into one antenna port group in ascending order of port numbers of the antenna ports; and (2) grouping a preset quantity of antenna ports into one antenna port group in descending order of port numbers of the antenna ports.

Action 4: The communications module 301 is configured to receive quasi-co-location indication information corresponding to a first reference signal resource. The quasi-co-location indication information is used to indicate that at least two of a plurality of antenna ports of the first reference signal resource are not in a quasi-co-location relationship. The processing module 302 is configured to group a plurality of CDM groups of the first reference signal into M antenna port groups according to a second quasi-co-location rule, where M is an integer greater than 1.

In the action 4, in a possible implementation, the quasi-co-location indication information is used to indicate that both a channel measurement resource and an interference measurement resource are the first reference signal resource.

In the action 4, in a possible implementation, the quasi-co-location indication information further includes an index of the second quasi-co-location rule.

In the action 4, in a possible implementation, the second quasi-co-location rule includes one of the following rules: (1) grouping a preset quantity of CDM groups into one antenna port group in ascending order of identifiers of the CDM groups; and (2) grouping a preset quantity of CDM groups into one antenna port group in descending order of identifiers of the CDM groups.

In the action 1 to the action 4, in a possible implementation, the communications module 301 is further configured to receive first indication information. The first indication information is used to indicate an antenna port group that is of a second reference signal resource and that has a quasi-co-location relationship with an antenna port group of the first reference signal resource. Alternatively, the first indication information is used to indicate an antenna port that is of a second reference signal resource and that has a quasi-co-location relationship with an antenna port of the first reference signal resource.

In the action 1 to the action 4, in a possible implementation, the communications module 301 is further configured to receive second indication information. The second indication information is used to indicate an antenna port group that is of the first reference signal resource and that has a quasi-co-location relationship with an antenna port group of a second reference signal resource. Alternatively, the second indication information is used to indicate an antenna port that is of the first reference signal resource and that has a quasi-co-location relationship with an antenna port of a second reference signal resource.

In the action 1 to the action 4, in a possible implementation, the processing module 302 is further configured to determine downlink channel state information based on the quasi-co-location relationship between the plurality of antenna ports of the first reference signal resource. The communications module 301 is further configured to send the downlink channel state information to a network device.

In an example, with reference to the terminal shown in FIG. 3, the communications module 301 in FIG. 11 may be implemented by the transceiver 103 in FIG. 3, and the processing module 302 in FIG. 11 may be implemented by the processor 101 in FIG. 3. This is not limited in this embodiment of this application.

An embodiment of this application further provides a computer-readable storage medium. The computer-readable storage medium stores computer instructions. When the computer-readable storage medium runs on the terminal shown in FIG. 3, the terminal is enabled to perform the methods shown in FIG. 4, and FIG. 7 to FIG. 10. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (solid state disk, SSD)), or the like.

An embodiment of this application further provides a chip. The chip includes a processing module and a communications interface. The communications interface is configured to transmit received code instructions to the processing module. The code instructions may be from a memory inside the chip, or may be from a memory outside the chip or another component. The processing module is configured to execute the code instructions to support the terminal in performing the methods shown in FIG. 4, and FIG. 7 to FIG. 10. The processing module is a processor, a microprocessor, or an integrated circuit integrated on the chip. The communications interface may be an input/output circuit or a receive/transmit pin.

An embodiment of this application further provides a computer program product including computer instructions. When the computer program product runs on the terminal shown in FIG. 3, the terminal is enabled to perform the methods shown in FIG. 4, and FIG. 7 to FIG. 10.

The terminal, the computer storage medium, the chip, and the computer program product provided in the embodiments of this application are all configured to perform the methods provided above. Therefore, for beneficial effects that can be achieved by the terminal, the computer storage medium, the chip, and the computer program product, refer to the beneficial effects corresponding to the methods provided above. Details are not described herein again.

Figure 12:
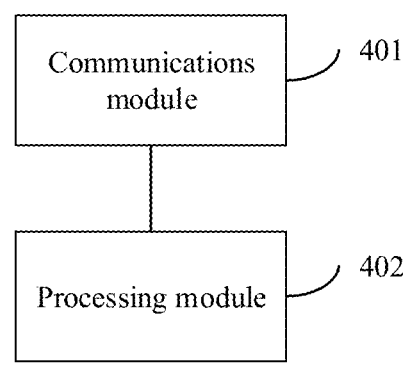
FIG. 12 is a schematic structural diagram of a network device according to an embodiment of this application.

FIG. 12 is a schematic structural diagram of a network device according to an embodiment of this application. As shown in FIG. 12, the network device includes a communications module 401 and a processing module 402. The network device may further perform any one of the following actions.

Action 1: The processing module 402 is configured to generate quasi-co-location indication information. The quasi-co-location indication information is used to indicate M antenna port groups. Each of the M antenna port groups includes one or more CDM groups of a first reference signal resource. The CDM group includes a plurality of antenna ports. Any two antenna ports in a same antenna port group are in a quasi-co-location relationship. M is an integer greater than 1. The communications module 401 is configured to send the quasi-co-location indication information to a terminal.

In the action 1, in a possible implementation, the quasi-co-location indication information includes information about the M antenna port groups. The information about the antenna port group includes an identifier of one or more CDM groups; or the information about the antenna port group is used to indicate a quantity of CDM groups included in the antenna port group.

In the action 1, in a possible implementation, the quasi-co-location indication information is further used to indicate a value of M.

In the action 1, in a possible implementation, the quasi-co-location indication information is further used to indicate a grouping manner of CDM groups, and the grouping manner includes at least one of a time domain grouping manner and a frequency domain grouping manner.

Action 2: The processing module 402 is configured to generate quasi-co-location indication information. The quasi-co-location indication information is used to indicate M antenna port groups. Each of the M antenna port groups includes one or more antenna ports of a first reference signal resource. Any two antenna ports in a same antenna port group are in a quasi-co-location relationship. M is an integer greater than 1. The communications module 401 is configured to send the quasi-co-location indication information to a terminal.

In the action 2, in a possible implementation, the quasi-co-location indication information includes information about the M antenna port groups. The information about the antenna port group includes port numbers of a plurality of antenna ports; or the information about the antenna port group is used to indicate a quantity of antenna ports included in the antenna port group.

In the action 2, in a possible implementation, the quasi-co-location indication information is further used to indicate a value of M.

Action 3: The processing module 402 is configured to generate quasi-co-location indication information corresponding to a first reference signal resource. The quasi-co-location indication information is used to indicate that at least two of N antenna ports of the first reference signal resource are not in a quasi-co-location relationship. The communications module 401 is configured to send the quasi-co-location indication information to a terminal.

In the action 3, in a possible implementation, the quasi-co-location indication information is used to indicate that both a channel measurement resource and an interference measurement resource are the first reference signal resource.

In the action 3, in a possible implementation, the quasi-co-location indication information further includes an index of a first quasi-co-location rule or an index of a second quasi-co-location rule. The first quasi-co-location rule is used by the terminal to group a plurality of antenna ports of the first reference signal resource into M antenna port groups. The second quasi-co-location rule is used by the terminal to group a plurality of CDM groups of the first reference signal resource into M antenna port groups. M is an integer greater than 1.

In the action 1 to the action 3, in a possible implementation, the processing module 402 is further configured to generate first indication information. The first indication information is used to indicate an antenna port group that is of a second reference signal resource and that has a quasi-co-location relationship with an antenna port group of the first reference signal resource. Alternatively, the first indication information is used to indicate an antenna port that is of a second reference signal resource and that has a quasi-co-location relationship with an antenna port of the first reference signal resource. The communications module 401 is further configured to send the first indication information to the terminal.

In the action 1 to the action 3, in a possible implementation, the processing module 402 is further configured to generate second indication information. The second indication information is used to indicate an antenna port group that is of the first reference signal resource and that has a quasi-co-location relationship with an antenna port group of a second reference signal resource. Alternatively, the second indication information is used to indicate an antenna port that is of the first reference signal resource and that has a quasi-co-location relationship with an antenna port of a second reference signal resource. The communications module 401 is further configured to send the second indication information to the terminal.

In the action 1 to the action 3, in a possible implementation, the communications module 401 is further configured to receive downlink channel state information sent by the terminal. The downlink channel state information is determined based on a quasi-co-location relationship between the plurality of antenna ports of the first reference signal resource.

In an example, with reference to the network device shown in FIG. 3, the communications module 401 in FIG. 12 may be implemented by the transceiver 203 in FIG. 3, and the processing module 402 in FIG. 12 may be implemented by the processor 201 in FIG. 3. This is not limited in this embodiment of this application.

An embodiment of this application further provides a computer-readable storage medium. The computer-readable storage medium stores computer instructions. When the computer-readable storage medium runs on the network device shown in FIG. 3, the network device is enabled to perform the methods shown in FIG. 4, and FIG. 7 and FIG. 8. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

An embodiment of this application further provides a chip. The chip includes a processing module and a communications interface. The communications interface is configured to transmit received code instructions to the processing module. The code instructions may be from a memory inside the chip, or may be from a memory outside the chip or another component. The processing module is configured to execute the code instructions to support the network device in performing the methods shown in FIG. 4, and FIG. 7 to FIG. 10. The processing module is a processor, a microprocessor, or an integrated circuit integrated on the chip. The communications interface may be an input/output circuit or a receive/transmit pin.

An embodiment of this application further provides a computer program product including computer instructions. When the computer program product runs on the network device shown in FIG. 3, the network device is enabled to perform the methods shown in FIG. 4, and FIG. 7 to FIG. 10.

The network device, the computer storage medium, the chip, and the computer program product provided in the embodiments of this application are all configured to perform the methods provided above. Therefore, for beneficial effects that can be achieved by the network device, the computer storage medium, the chip, and the computer program product, refer to the beneficial effects corresponding to the methods provided above. Details are not described herein again.

An embodiment of this application further provides a communications system. The communications system includes a terminal and a network device. The terminal and the network device are configured to perform the methods shown in FIG. 4, and FIG. 7 to FIG. 10.

Although this application is described with reference to the embodiments, a person skilled in the art may understand and implement another variation of the disclosed embodiments by viewing the accompanying drawings, disclosed content, and the accompanying claims. In the claims, "comprising (comprising)" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the accompanying claims, and are considered as any of or all modifications, variations, combinations, or equivalents that cover the scope of this application. It is clear that a person skilled in the art can make various modifications and variations to this application without departing from the spirit and scope of this application. In this way, this application is intended to cover these modifications and variations of this application provided that they fall within the scope of protection defined by the following claims and their equivalent technologies.

What is claimed is:

1. A quasi co-location indication method, wherein the method comprises:
   receiving quasi co-location indication information, wherein the quasi co-location indication information indicates:
   M antenna port groups corresponding to a first reference signal resource, each of the M antenna port groups comprises one or more code division multiplexing (CDM) groups of the first reference signal resource, each CDM group of the CDM groups comprises a plurality of antenna ports, any two of the plurality of antenna ports that are in a same one of the M antenna port groups have a quasi-co-location relationship, and M is an integer greater than 1; and a grouping manner of the CDM groups, wherein the grouping manner is at least one of a time domain grouping manner or a frequency domain grouping manner; and determining, for at least one of the CDM groups, the quasi-co-location relationship of the two or more of the plurality of antenna ports of at least one of the one or more antenna port groups of the first reference signal resource based on the quasi-co-location indication information, wherein the quasi co-location indication information includes an identifier indicating which one of at least two quasi co-location rules is to be applied for grouping a preset quantity of antenna ports into one antenna port group, the at least two quasi co-location rules include a corresponding rule-defined order according to which the preset quantity of antenna ports are to be arranged in the one antenna port group in response to a processing of the identifier included in the received quasi co-location information to determine which one of the at least two quasi co-location rules is to be applied, and the corresponding rule-defined order is one of an ascending or a descending order of the antenna ports in the one antenna port group.

2. The quasi co-location indication method according to claim 1, wherein the quasi co-location indication information comprises information associated with the M antenna port groups; and the information associated with the M antenna port groups indicates an identifier of one or more of the CDM groups; or the information associated with the M antenna port groups indicates a quantity of the CDM groups included in one of the M antenna port groups.

3. The quasi co-location indication method according to claim 1, wherein the quasi-co-location indication information is further indicates a value of M.

4. The quasi co-location indication method according to claim 1, wherein the grouping manner comprises both the time domain grouping manner and the frequency domain grouping manner.

5. The quasi co-location indication method according to claim 1, wherein the method further comprises:

receiving first indication information, wherein the first indication information indicates an antenna port group that is of a second reference signal resource and that has the quasi-co-location relationship with a first one of the M antenna port groups of the first reference signal resource; or the first indication information indicates an antenna port that is of a second reference signal resource and that has a quasi-co-location relationship with a first one of the plurality of antenna ports of a first one of the CDM groups of the first reference signal resource.

6. The quasi co-location indication method according to claim 1, wherein the method further comprises:

receiving second indication information, wherein the second indication information indicates a first one of the M antenna port groups that is of the first reference signal resource and that has the quasi-co-location relationship with an antenna port group of a second reference signal resource; or the second indication information indicates a first one of the plurality of antenna ports of a first one of the CDM groups that is of the first reference signal resource and that has the quasi-co-location relationship with an antenna port of a second reference signal resource.

7. The quasi co-location indication method according to claim 1, wherein the method further comprises:

determining downlink channel state information based on the quasi-co-location relationship between the plurality of antenna ports of the first reference signal resource.

8. An apparatus, comprising: at least one processor and one or more memories, wherein the one or more memories are coupled to the at least one processor and store programming instructions for execution by the at least one processor to:

cause a transceiver to receive quasi co-location indication information, wherein the quasi co-location indication information indicates:

M antenna port groups corresponding to a first reference signal resource, each of the M antenna port groups comprises one or more code division multiplexing (CDM) groups of the first reference signal resource, each CDM group of the CDM groups comprises a plurality of antenna ports, any two of the plurality of antenna ports that are in a same one of the M antenna port groups have a quasi-co-location relationship, and M is an integer greater than 1; and a grouping manner of the CDM groups, wherein the grouping manner is at least one of a time domain grouping manner or a frequency domain grouping manner; and determine, for at least one of the CDM groups, the quasi-co-location relationship of the two or more of the plurality of antenna ports of at least one of the one or more antenna port groups of the first reference signal resource based on the quasi-co-location indication information, wherein the quasi co-location indication information includes an identifier indicating which one of at least two quasi co-location rules is to be applied for grouping a preset quantity of antenna ports into one antenna port group, the at least two quasi co-location rules include a corresponding rule-defined order according to which the preset quantity of antenna ports are to be arranged in the one antenna port group in response to a processing of the identifier included in the received quasi co-location information to determine which one of the at least two quasi co-location rules is to be applied, and the corresponding rule-defined order is one of an ascending or a descending order of the antenna ports in the one antenna port group.

9. The apparatus according to claim 8, wherein the quasi co-location indication information comprises information associated with the M antenna port groups; and the information comprises an identifier of one or more of the CDM groups; or the information indicates a quantity of the CDM groups in one of the M antenna port groups.

10. The apparatus according to claim 8, wherein the quasi-co-location indication information is further indicates a value of M.

11. The apparatus according to claim 8, wherein the grouping manner comprises both the time domain grouping manner and the frequency domain grouping manner.

12. The apparatus according to claim 8, wherein the one or more memories store the programming instructions for execution by the at least one processor further to:
cause the transceiver to receive first indication information, wherein
the first indication information indicates an antenna port group that is of a second reference signal resource and that has the quasi-co-location relationship with a first one of the M antenna port groups of the first reference signal resource; or
the first indication information indicates an antenna port that is of a second reference signal resource and that has a quasi-co-location relationship with a first one of the plurality of antenna ports of a first one of the CDM groups of the first reference signal resource.

13. The apparatus according to claim 8, wherein the one or more memories store the programming instructions for execution by the at least one processor further to:
cause the transceiver to receive second indication information, wherein
the second indication information indicates a first one of the M antenna port groups that is of the first reference signal resource and that has the quasi-co-location relationship with an antenna port group of a second reference signal resource; or
the second indication information indicates a first one of the plurality of antenna ports of a first one of the CDM groups that is of the first reference signal resource and that has the quasi-co-location relationship with an antenna port of a second reference signal resource.

14. The apparatus according to claim 8, wherein the one or more memories store the programming instructions for execution by the at least one processor further to:
determine downlink channel state information based on the quasi-co-location relationship between the plurality of antenna ports of the first reference signal resource.

15. An apparatus, comprising: at least one processor and one or more memories, wherein the one or more memories are coupled to the at least one processor and store programming instructions for execution by the at least one processor to:
generate quasi co-location indication information, wherein the quasi co-location indication information indicates:
M antenna port groups corresponding to a first reference signal resource, each of the M antenna port groups comprises one or more code division multiplexing (CDM) groups of the first reference signal resource, each CDM group of the CDM groups comprises a plurality of antenna ports, any two of the plurality of antenna ports that are in a same one of the M antenna port groups have a quasi-co-location relationship, and M is an integer greater than 1; and
a grouping manner of the CDM groups, wherein the grouping manner is at least one of a time domain grouping manner or a frequency domain grouping manner; and
cause a transceiver to send the quasi co-location indication information,
wherein
the quasi co-location indication information includes an identifier indicating which one of at least two quasi co-location rules is to be applied for grouping a preset quantity of antenna ports into one antenna port group,
the at least two quasi co-location rules include a corresponding rule-defined order according to which the preset quantity of antenna ports are to be arranged in the one antenna port group in response to a processing of the identifier included in the received quasi co-location information to determine which one of the at least two quasi co-location rules is to be applied, and
the corresponding rule-defined order is one of an ascending or a descending order of the antenna ports in the one antenna port group.

16. The apparatus according to claim 15, wherein the quasi co-location indication information comprises information associated with the M antenna port groups; and
the information about the antenna associated with the M antenna port groups indicates an identifier of one or more of the CDM groups; or
the information associated with the M antenna port groups indicates a quantity of the CDM groups included in one of the M antenna port groups.

17. The apparatus according to claim 15, wherein the quasi co-location indication information is further indicates a value of M.

18. The apparatus according to claim 15, wherein the grouping manner comprises both the time domain grouping manner and the frequency domain grouping manner.

19. The apparatus according to claim 15, wherein the one or more memories store the programming instructions for execution by the at least one processor further to:
cause the transceiver to send first indication information, wherein
the first indication information indicates an antenna port group that is of a second reference signal resource and that has the quasi-co-location relationship with a first one of the M antenna port groups of the first reference signal resource; or
the first indication information indicates an antenna port that is of a second reference signal resource and that has a quasi-co-location relationship with a first one of the plurality of antenna ports of a first one of the CDM groups of the first reference signal resource.

20. The apparatus according to claim 15, wherein the one or more memories store the programming instructions for execution by the at least one processor further to:
cause the transceiver to send second indication information, wherein
the second indication information indicates a first one of the M antenna port groups that is of the first reference signal resource and that has the quasi-co-location relationship with an antenna port group of a second reference signal resource; or
the second indication information indicates a first one of the plurality of antenna ports of a first one of the CDM groups that is of the first reference signal resource and that has the quasi-co-location relationship with an antenna port of a second reference signal resource.

* * * * *